(12) United States Patent
Kato et al.

(10) Patent No.: US 9,100,187 B2
(45) Date of Patent: Aug. 4, 2015

(54) AUTHENTICATOR

(71) Applicant: KABUSHIKI KAISHA TOSHIBA, Minato-ku (JP)

(72) Inventors: Taku Kato, Kamakura (JP); Tatsuyuki Matsushita, Tokyo (JP); Yuji Nagai, Sagamihara (JP); Shinichi Matsukawa, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/148,497

(22) Filed: Jan. 6, 2014

(65) Prior Publication Data
US 2014/0122868 A1 May 1, 2014

Related U.S. Application Data

(63) Continuation of application No. 13/524,417, filed on Jun. 15, 2012, now Pat. No. 8,650,393.

(30) Foreign Application Priority Data

Nov. 11, 2011 (JP) .................................. 2011-248056

(51) Int. Cl.
*H04L 29/06* (2006.01)
*H04L 9/32* (2006.01)
(Continued)

(52) U.S. Cl.
CPC .......... *H04L 9/321* (2013.01); *G11B 20/00115* (2013.01); *G11B 20/00217* (2013.01);
(Continued)

(58) Field of Classification Search
CPC ............ H04L 2209/601; H04L 9/0897; H04L 9/0816; H04L 9/0822; H04L 9/0833; H04L 9/32; G11B 20/00086; G11B 20/00115; G11B 20/0021; G11B 2220/2516; G11B 2220/60

USPC .......................................... 713/155; 380/255
See application file for complete search history.

(56) References Cited

U.S. PATENT DOCUMENTS

| 4,757,468 | A | 7/1988 | Domenik et al. |
| 4,760,526 | A | 7/1988 | Takeda et al. |

(Continued)

FOREIGN PATENT DOCUMENTS

| EP | 1 126 355 A1 | 8/2001 |
| EP | 1 983 466 A2 | 10/2008 |

(Continued)

OTHER PUBLICATIONS

International Preliminary Report on Patentability and Written Opinion issued Jun. 12, 2014, in International Application No. PCT/JP2012/065933 (English Translation).

(Continued)

*Primary Examiner* — Kambiz Zand
*Assistant Examiner* — Abiy Getachew
(74) *Attorney, Agent, or Firm* — Oblon, McClelland, Maier & Neustadt, L.L.P.

(57) ABSTRACT

According to one embodiment, a method for authenticating a device, wherein the device holds secret identification information, encrypted secret identification information, and key management information, and an authenticator holds an identification key, the method includes reading, by the authenticator, the encrypted secret identification information and the key management information from the device, and obtaining, by the authenticator, a family key by using the key management information, the family key being capable of being decrypted with the identification key. The method further includes obtaining, by the authenticator, the secret identification information by decrypting the encrypted secret identification information with the family key.

6 Claims, 13 Drawing Sheets

(51) Int. Cl.
*H04L 9/08* (2006.01)
*G11B 20/00* (2006.01)

(52) U.S. Cl.
CPC ............ *H04L9/0816* (2013.01); *H04L 9/0822* (2013.01); *H04L 9/0833* (2013.01); *H04L 9/0869* (2013.01); *H04L 9/0897* (2013.01); *H04L 9/32* (2013.01); *G11B 2220/60* (2013.01); *H04L 2209/601* (2013.01)

(56) References Cited

U.S. PATENT DOCUMENTS

| | | | |
|---|---|---|---|
| 4,910,774 | A | 3/1990 | Barakat |
| 6,829,676 | B2 | 12/2004 | Maeda et al. |
| 6,950,379 | B2 | 9/2005 | Yen et al. |
| 7,065,648 | B1 | 6/2006 | Kamibayashi et al. |
| 7,240,157 | B2 | 7/2007 | Frank et al. |
| 7,266,695 | B2 | 9/2007 | Nakayama |
| 7,395,429 | B2 | 7/2008 | Kitani et al. |
| 7,484,090 | B2 | 1/2009 | Ohmori et al. |
| 7,533,276 | B2 | 5/2009 | Matsushima et al. |
| 7,565,698 | B2 | 7/2009 | Isozaki et al. |
| 7,712,131 | B1 | 5/2010 | Lethe |
| 7,721,343 | B2 | 5/2010 | Kato et al. |
| 7,797,536 | B1 | 9/2010 | Lyle |
| 7,971,070 | B2 | 6/2011 | Lotspiech et al. |
| 7,979,915 | B2 | 7/2011 | Nakano et al. |
| 8,020,199 | B2 | 9/2011 | Smith et al. |
| 8,131,646 | B2 | 3/2012 | Kocher et al. |
| 8,260,259 | B2 | 9/2012 | Semple et al. |
| 8,261,130 | B2 | 9/2012 | Mayer et al. |
| 8,290,146 | B2 | 10/2012 | Takashima |
| 8,296,477 | B1 | 10/2012 | Polk |
| 8,321,924 | B2 | 11/2012 | Lu et al. |
| 8,336,096 | B2 | 12/2012 | Narusawa et al. |
| 8,364,881 | B2 | 1/2013 | Urabe |
| 8,381,062 | B1 | 2/2013 | Juels et al. |
| 8,510,548 | B1 | 8/2013 | Markov et al. |
| 8,677,144 | B2 | 3/2014 | Haider et al. |
| 2001/0021255 | A1 | 9/2001 | Ishibashi |
| 2002/0059518 | A1 | 5/2002 | Smeets et al. |
| 2002/0087814 | A1 | 7/2002 | Ripley et al. |
| 2002/0087871 | A1 | 7/2002 | Ripley et al. |
| 2002/0116632 | A1 | 8/2002 | Itoh et al. |
| 2003/0070082 | A1 | 4/2003 | Nimura et al. |
| 2003/0105961 | A1 | 6/2003 | Zatloukal et al. |
| 2003/0154355 | A1 | 8/2003 | Fernandez |
| 2003/0221116 | A1 | 11/2003 | Futoransky et al. |
| 2004/0039924 | A1 | 2/2004 | Baldwin et al. |
| 2004/0133794 | A1 | 7/2004 | Kocher et al. |
| 2004/0190868 | A1 | 9/2004 | Nakano et al. |
| 2005/0038997 | A1 | 2/2005 | Kojima et al. |
| 2005/0039022 | A1 | 2/2005 | Venkatesan et al. |
| 2005/0086497 | A1 | 4/2005 | Nakayama |
| 2005/0128050 | A1 | 6/2005 | Frolov et al. |
| 2005/0182948 | A1 | 8/2005 | Ducharme |
| 2005/0257243 | A1 | 11/2005 | Baker |
| 2005/0262347 | A1 | 11/2005 | Sato et al. |
| 2006/0060065 | A1 | 3/2006 | Abe et al. |
| 2006/0085644 | A1 | 4/2006 | Isozaki et al. |
| 2006/0141987 | A1 | 6/2006 | De Groot |
| 2007/0074050 | A1 | 3/2007 | Camiel |
| 2007/0143838 | A1 | 6/2007 | Milligan et al. |
| 2007/0165860 | A1 | 7/2007 | Handa et al. |
| 2007/0174198 | A1 | 7/2007 | Kasahara et al. |
| 2007/0186110 | A1 | 8/2007 | Takashima |
| 2007/0198851 | A1* | 8/2007 | Goto .............................. 713/187 |
| 2008/0049934 | A1 | 2/2008 | Onoda et al. |
| 2008/0098212 | A1 | 4/2008 | Helms et al. |
| 2008/0101604 | A1 | 5/2008 | Kocher et al. |
| 2008/0172427 | A1 | 7/2008 | Ito |
| 2008/0210747 | A1 | 9/2008 | Takashima |
| 2008/0228821 | A1 | 9/2008 | Mick et al. |
| 2008/0263362 | A1* | 10/2008 | Chen .............................. 713/184 |
| 2008/0294562 | A1 | 11/2008 | Kasahara et al. |
| 2009/0086966 | A1 | 4/2009 | Haruki et al. |
| 2009/0106551 | A1 | 4/2009 | Boren et al. |
| 2009/0208003 | A1* | 8/2009 | Matsukawa et al. ............ 380/44 |
| 2009/0232314 | A1 | 9/2009 | Kato et al. |
| 2009/0249492 | A1 | 10/2009 | Boesgaard Sorensen |
| 2009/0313480 | A1 | 12/2009 | Michiels et al. |
| 2010/0008509 | A1 | 1/2010 | Matsushita et al. |
| 2010/0017626 | A1 | 1/2010 | Sato et al. |
| 2010/0146501 | A1 | 6/2010 | Wyatt et al. |
| 2010/0199129 | A1 | 8/2010 | Kitani |
| 2010/0268953 | A1 | 10/2010 | Matsukawa et al. |
| 2010/0275036 | A1 | 10/2010 | Harada et al. |
| 2011/0222691 | A1 | 9/2011 | Yamaguchi et al. |
| 2011/0225089 | A1 | 9/2011 | Hammad |
| 2011/0246791 | A1* | 10/2011 | Kambayashi et al. ........ 713/193 |
| 2011/0276490 | A1 | 11/2011 | Wang et al. |
| 2012/0137135 | A1 | 5/2012 | Kasahara et al. |
| 2012/0137137 | A1 | 5/2012 | Brickell et al. |
| 2012/0272065 | A1 | 10/2012 | Matsukawa et al. |
| 2013/0054961 | A1 | 2/2013 | Kato et al. |
| 2013/0159733 | A1 | 6/2013 | Lee et al. |

FOREIGN PATENT DOCUMENTS

| | | |
|---|---|---|
| EP | 1 983 466 A3 | 10/2008 |
| JP | 63-29785 | 2/1988 |
| JP | 63-70634 | 3/1988 |
| JP | 3-171231 A | 7/1991 |
| JP | 8-204702 A | 8/1996 |
| JP | 10-232918 A | 9/1998 |
| JP | 2000-122931 A | 4/2000 |
| JP | 2001-209305 A | 8/2001 |
| JP | 2003-143128 | 5/2003 |
| JP | 2003-233795 A | 8/2003 |
| JP | 2004-30326 A | 1/2004 |
| JP | 2005-316946 | 11/2005 |
| JP | 2005-341156 A | 12/2005 |
| JP | 2006-172147 A | 6/2006 |
| JP | 2007-208897 | 8/2007 |
| JP | 2007-525748 A | 9/2007 |
| JP | 2008-22367 A | 1/2008 |
| JP | 2008-35397 A | 2/2008 |
| JP | 2008-506317 A | 2/2008 |
| JP | 2008-84445 A | 4/2008 |
| JP | 2008-269088 A | 11/2008 |
| JP | 2009-87497 A | 4/2009 |
| JP | 2009-100394 A | 5/2009 |
| JP | 2009-105566 | 5/2009 |
| JP | 2009-543244 | 12/2009 |
| JP | 2010-28485 A | 2/2010 |
| JP | 2010-140470 | 6/2010 |
| JP | 2010-183278 A | 8/2010 |
| JP | 2010-267240 A | 11/2010 |
| JP | 2010-267540 A | 11/2010 |
| JP | 2010-268417 A | 11/2010 |
| JP | 2010-287005 A | 12/2010 |
| JP | 2011-209802 A | 10/2011 |
| JP | 2011-215983 A | 10/2011 |
| JP | 2012-14416 A | 1/2012 |
| JP | 2013-55370 | 3/2013 |
| JP | 2013-106162 | 5/2013 |
| TW | I266190 | 11/2006 |
| WO | WO 01/11883 A1 | 2/2001 |
| WO | WO 02/33521 A2 | 4/2002 |
| WO | WO 02/33521 A3 | 4/2002 |
| WO | WO 03/048938 A1 | 6/2003 |
| WO | WO 2007/028099 A2 | 3/2007 |
| WO | WO 2010/035449 A1 | 4/2010 |
| WO | WO 2011/064883 A1 | 6/2011 |

OTHER PUBLICATIONS

International Preliminary Report on Patentability and Written Opinion issued May 22, 2014, in International Application No. PCT/JP2012/065937(English Translation).

"Content Protection for Recordable Media (CPRM) Specification: SD Memory Card Book Common Part", 4C Entity, LLC, http://www.4centity.com, Revision 0.97, Dec. 15, 2010, 20 pages.

(56) References Cited

OTHER PUBLICATIONS

"Media Identifier Management Technology (MIMT) Specification", 4C Entity, LLC, http://www.4centity.com, Revision 0.85, Sep. 27, 2010, 13 pages.
Dalit Naor, et al., "Revocation and Tracing Schemes for Stateless Receivers", Proc. Crypto, LNCS 2139, 2001, pp. 41-62.
"Content Protection for Recordable Media (CPRM) Specification: Introduction and Common Cryptographic Elements", 4C Entity, LLC, http://www.4centity.com, Revision 1.1, Dec. 15, 2010, 38 pages.
Office Action issued Oct. 16, 2012 in Japanese Patent Application No. 2011-265281 with English language translation.
Office Action issued Oct. 16, 2012 in Japanese Patent Application No. 2011-265289 with English language translation.
Office Action issued Nov. 20, 2012 in Japanese Patent Application No. 2011-248056 with English language translation.
Office Action issued Nov. 27, 2012 in Japanese Patent Application No. 2011-265281 with English language translation.
David Hoff, et al., "System and software security via authentication handshake in EPROM", 1985 Proceedings of the National Computer Conference, http://www.computer.org/csdl/proceedinqs/afips/1985/5092/00/50920203-abs.html>, vol. 54, 1985, pp. 203-209 with cover pages.
International Search Report and Written Opinion issued Nov. 22, 2012 in Application No. PCT/JP2012/065938.
International Search Report and Written Opinion issued Aug. 16, 2012 in PCT/JP2012/058276 filed Mar. 19, 2012.
International Search Report and Written Opinion issued Nov. 22, 2012 in PCT/JP2012/065932, filed Jun. 15, 2012.
International Search Report and Written Opinion issued Nov. 22, 2012 in PCT/JP2012/065933, filed Jun. 15, 2012.
International Search Report and Written Opinion issued Nov. 22, 2012 in PCT/JP2012/065937, filed Jun. 15, 2012.
International Search Report and Written Opinion issued Nov. 22, 2012, in PCT/JP2012/065934 filed Jun. 15, 2012.
International Search Report and Written Opinion issued Nov. 22, 2012 in PCT/JP2012/065935 filed Jun. 15, 2012.
"Content Protection for Recordable Media Specification", Revision 1.0, 4C Entity, LLC., http://www.4centity.com, Jan. 17, 2003, 31 pages.
"Content Protection for eXtended Media Specification", Revision 0.85 Preliminary Release, 4C Entity, LLC, http://www.4CEntity.com, Sep. 27, 2010, 16 pages.
"Content Protection for Prerecorded Media Specification: Introduction and Common Cryptographic Elements", Revision 1.0, 4centity, Jan. 17, 2003, 25 pages.
"Content Protection for eXtended Media Specification: SD Memory Card Book Common Part", Revision 0.85 Preliminary Release, 4centity, Sep. 27, 2010, 38 pages.
"Next Generation Secure Memory", www.nextgenerationsecurememory.com, Mar. 2012, 9 Pages.
Kocher, P., et al., "Self-Protecting Digital Content—A Technical Report From the CRI Content Security Research Initiative," Cryptography Research, Inc., http://www.cryptography.com/public/pdf/selfprotectingcontent.pdf, 2003, pp. 1-14.
"Introduction and Common Cryptographic Elements Book," Advanced Access Content System (AACS), Revision 0.953, http://www.aacsla.com/specifications, Oct. 26, 2012, Total 102 Pages.
"Pre-recorded Video Book," Advanced Access Content System (AACS), Revision 0.952, http://www.aacsla.com/specifications, Jul. 14, 2011, Total 86 Pages.
International Search Report Issued Jun. 28, 2011 in PCT/JP11/62860 Filed May 30, 2011.
"Prepared Video Book," Advanced Access Content System (AACS), Revision 0.953, http://www.aacsla.com/specifications, Oct. 26, 2012, Total 45 Pages.
"Recordable Video Book," Advanced Access Content System (AACS), Revision 0.953, http://www.aacsla.com/specifications,Oct. 26, 2012, Total 22 Pages.
"Blu-ray Disc Pre-recorded Book," Advanced Access Content System (AACS), Revision 0.953, http://www.aacsla.com/specifications, Oct. 26, 2012, Total 173 Pages.
"Blu-ray Disc Prepared Video Book," Advanced Access Content System (AACS), Revision 0.953, http://www.aacsla.com/specifications, Oct. 26, 2012, Total 59 Pages.
"Blu-ray Disc Recordable Book," Advanced Access Content System (AACS), Revision 0.953, http://www.aacsla.com/specifications, Oct. 26, 2012, Total 61 Pages.
"HD DVD and DVD Pre-recorded Book," Advanced Access Content System (AACS), Revision 0.953, http://www.aacsla.com/specifications, Oct. 26, 2012, Total 154 Pages.
"HD DVD and DVD Prepared Video Book," Advanced Access Content System (AACS), Revision 0.953, http://www.aacsla.com/specifications, Oct. 26, 2012, Total 43 Pages.
"HD DVD and DVD Recordable Book," Advanced Access Content System (AACS), Revision 0.953, http://www.aacsla.com/specifications, Oct. 26, 2012, Total 65 Pages.
"Signed CSS Book," Advanced Access Content System (AACS), Revision 0.953, http://www.aacsla.com/specifications, Oct. 26, 2012, Total 18 Pages.
"Introduction and Common Cryptographic Elements," Advanced Access Content System (AACS), Revision 0.91, http://www.aacsla.com/specifications, Feb. 17, 2006, Total 82 Pages.
"Pre-recorded Video Book," Advanced Access Content System (AACS), Revision 0.92, http://www.aacsla.com/specifications, Total 61 Pages, (Nov. 29, 2007).
"Recordable Video Book," Advanced Access Content System (AACS), Revision 0.91, http://www.aacsla.com/specifications, Total 23 Pages, (Feb. 17, 2006).
"CBHD Pre-recorded Book," Advanced Access Content System (AACS), Revision 0.90, http://www.aacsla.com/specifications, Total 91 Pages, (Oct. 7, 2008).
"Blu-ray Disc Pre-recorded Book," Advanced Access Content System (AACS), Revision 0.921, http://www.aacsla.com/specifications, Total 117 Pages, (Jun. 6, 2008).
"Blu-ray Disc Recordable Book," Advanced Access Content System (AACS), Revision 0.921, http://www.aacsla.com/specifications, Total 55 Pages, (Aug. 5, 2008).
"HD DVD and DVD Pre-recorded Book," Advanced Access Content System (AACS), Revision 0.912, http://www.aacsla.com/specifications, Total 166 Pages, (Aug. 15, 2006).
"HD DVD and DVD Recordable Book," Advanced Access Content System (AACS), Revision 0.921, http://www.aacsla.com/specifications, Total 59 Pages, (Jul. 25, 2006).
"Content Protection for Recordable Media Specification SD Memory Card Book Common Part", (Intel Corporation), Revision 0.96, Nov. 26, 2001, 4C Entity, LLC, 36 pages.
English translation of the International Preliminary Report on Patentability issued Apr. 25, 2013, in PCT/JP2011/062860, filed May 30, 2011.
English translation of the Written Opinion of the International Searching Authority issued Jun. 28, 2011, in PCT/JP2011/062860, filed May 30, 2011.
Japanese Office Action (with English Translation) mailed Nov. 22, 2013 in patent application No. 2012-209681.
Taiwanese Office Action (with English Translation) mailed Nov. 4, 2013 in patent application No. 100120444.
Japanese Office Action issued Apr. 15, 2014, in Japan Patent Application No. 2013-032349 (with English translation).
Alfred J. Menezes, et al., "Handbook of Applied Cryptography", CRC Press LLC, 1997, pp. 42, 192, 226, 227, and 246.

* cited by examiner

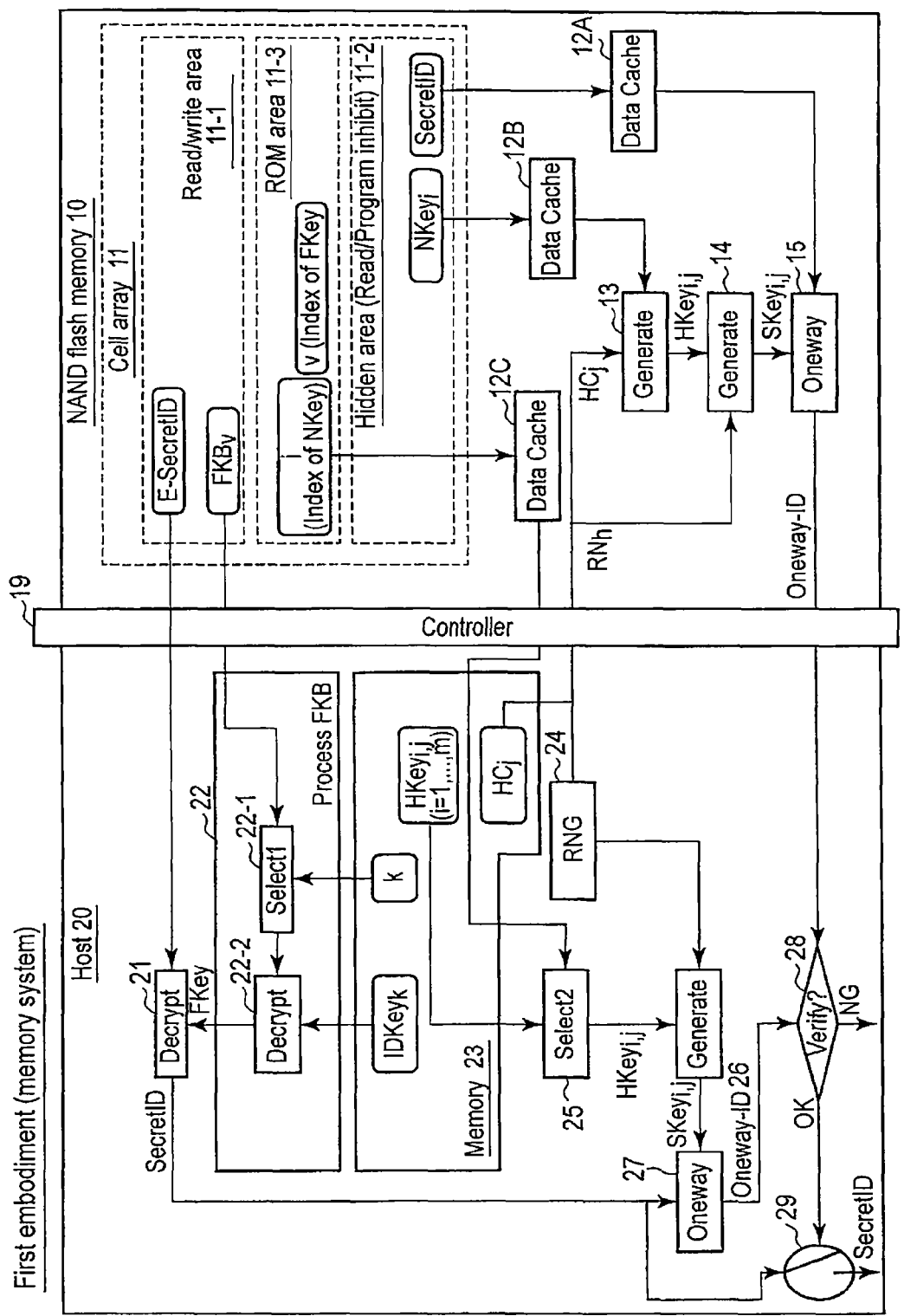
F I G. 1

AUTHENTICATOR

CROSS-REFERENCE TO RELATED APPLICATIONS

This application is a Continuation of and claims the benefit of priority under 35 U.S.C. §120 from U.S. Ser. No. 13/524,417, filed Jun. 15, 2012, and is based upon and claims the benefit of priority from prior Japanese Patent Application No. 2011-248056, filed Nov. 11, 2011, the entire contents of each of which are incorporated herein by reference.

FIELD

Embodiments described herein relate generally to an authenticator, an authenticatee, and an authentication method therefor.

BACKGROUND

In general, in fields of information security, a method using mutually shared secret information and an encryptor is adopted as means for certifying one's own authenticity.

For example, in an IC card (Smart Card), etc., which are used for electronic settlement, an ID and secret information for individualizing the IC card are stored in an IC in the card. Further, the IC card has a cipher processing function for executing authentication based on the ID and secret information.

In another example, an authentication method called Content Protection for Recordable Media (CPRM) is specified as means for certifying authenticity of an SD (registered trademark) card in protection of copyrighted content.

BRIEF DESCRIPTION OF THE DRAWINGS

FIG. 1 is a block diagram showing a configuration example of a memory system according to a first embodiment;

DETAILED DESCRIPTION

Figure 2:
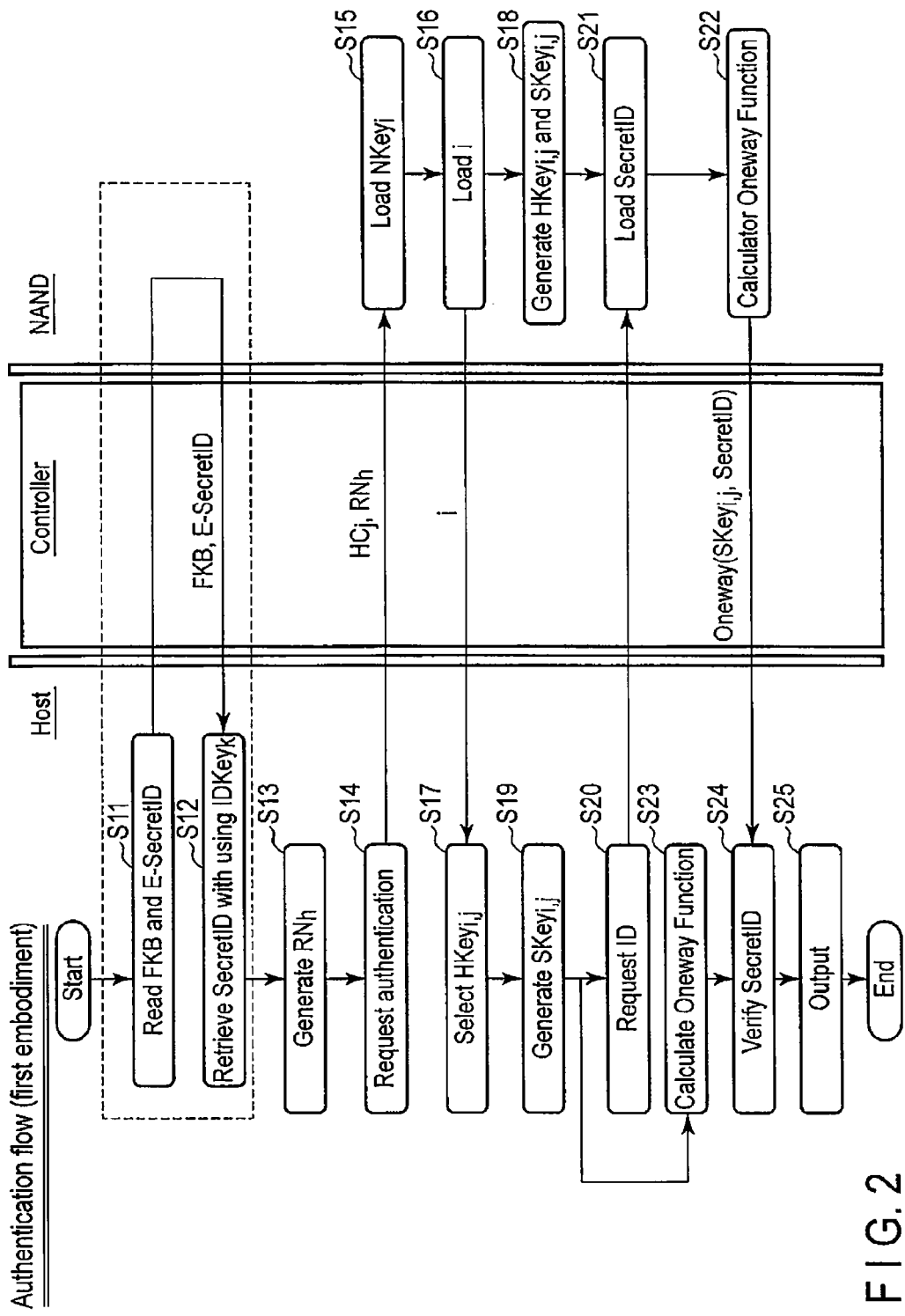
FIG. 2 is a flow chart showing an authentication flow of the memory system according to the first embodiment.

In general, according to one embodiment, a method for authenticating a device by an authenticator, wherein the device holds secret identification information (SecretID) hidden to outside of the device and unique to the device, encrypted secret identification information (E-SecretID) unique to the device, and key management information (FKB: family key block), and the authenticator holds an identification key (IDKey), the method includes:

reading, by the authenticator, the encrypted secret identification information (E-SecretID) and the key management information (FKB) from the device;

obtaining, by the authenticator, a family key (FKey) by using the key management information (FKB), the family key being capable of being decrypted with the identification key (IDKey); and obtaining, by the authenticator, the secret identification information (SecretID) by decrypting the encrypted secret identification information (E-SecretID) with the family key (FKey).

Embodiments will be described below with reference to drawings. In the description below, a memory system is taken as an example of an authenticator, an authenticatee, and an authentication method, but the embodiments are not limited to such an example. The authenticatee described herein is a device to be authenticated. For example, the authenticatee includes a discrete device (for example, memory device), a module (for example, a card in which the memory device is embedded), an apparatus (for example, an apparatus with built-in modules), and a combination of any of the discrete device, the module, and the apparatus. In the description below, common parts are denoted by like reference numerals throughout the drawings.

First Embodiment

An authenticator, an authenticatee, and an authentication method therefore according to a first embodiment will be described.

<1. Configuration Example (Memory System)>

A configuration example of a memory system according to the first embodiment will be described by using FIG. 1.

As shown in FIG. 1, the memory system according to the first embodiment includes a NAND flash memory 10 as an authenticatee, a host device 20 as an authenticator, and a controller 19 mediating therebetween. Host device 20 accesses NAND flash memory 10 via controller 19.

Here, a manufacturing process of a semiconductor product such as NAND flash memory 10 will briefly be described. The manufacturing process of a semiconductor product can mainly divided into a preprocess to form a circuit on a substrate wafer and a postprocess to cut the wafer to individual pieces and then to perform wiring and packaging a piece in a resin.

Controller 19 may be embedded in NAND flash memory 10 in the preprocess, may be embedded in a package with NAND flash memory 10 in the postprocess, not in the preprocess, or may be provided as a different chip from NAND flash memory 10. The description below including FIG. 1 is provided by taking a case when the controller 19 is provided as a different chip from NAND flash memory 10 as an example.

If not mentioned specifically below, controller 19 mediates between host device 20 and NAND flash memory 10 in many cases to exchange data and instructions therebetween. Even in such a case, controller 19 does not change intrinsic content of the above data and instructions and thus, details may be provided below as an abbreviated description. Details of configuration examples of NAND flash memory 10 and controller 19 will be provided later.

If host device 20 may be configured as dedicated hardware like a consumer device, a combination of a dedicated hardware and firmware to operate the dedicated hardware, or software program operating in a PC to realize functions of device 20.

Each component and data processing shown in FIG. 1 will be described below. The present embodiment shows the method of reading secret identification information SecretID recorded in NAND flash memory 10 as an authenticatee in a state hidden from third parties and also verifying that the data has been read from an authenticatee and a configuration example when the method is applied to NAND flash memory 10.

1-1. NAND Flash Memory

In the present embodiment, NAND flash memory 10 is an authenticatee.

As shown in FIG. 1, NAND flash memory 10 includes a cell array 11, data caches 12A, 12B, and 12C disposed in a peripheral area of cell array 11, data generator circuit (Generate) 13, 14, and a one-way converter (Oneway) 15.

Cell array 11 includes an ordinary area (Read/Write area) 11-1 permitted to read and write into from outside, a hidden area (Hidden area) 11-2 inhibited from both reading and writing into from outside, and a ROM area (ROM area) 11-3 inhibited from writing into from outside.

Read/write area (ordinary area) 11-1 is an area into which data can be written and from which data can be read from outside NAND flash memory 10. In read/write area 11-1, encrypted secret identification information (E-SecretID) and key management information FKBv (Family Key Block) is stored. E-SecretID is secret identification information (Secret ID) encrypted with an index v stored in ROM area 11-3. FKBv is an encrypted FKey pack (that is, a set of plural encrypted FKeys) prepared to hide FKeyv. In contrast to other data recorded in NAND flash memory 10, FKBv may be record when NAND flash memory 10 is fabricated, or when the storage media (for example, SD card) for general user is fabricated by connecting the controller to NAND flash memory 10. Alternatively, FKBv may be downloaded from a server in accordance with a user's request after shipping and then recovered in NAND flash memory 10.

Key management information FKBv is information used to decrypt hidden information FKeyv based on identification key information IDKeyk (describe later) held by host device 20 and index information k of identification key information IDKeyk, or information used to decrypt hidden information FKeyv based on identification key information IDKeyk (described later) held by host device 20 and identification information of host device 20.

Key management information FKBv may be prepared uniquely for each of NAND flash memories 10 in accordance with the manufacturing process, or may be common to a plurality of NAND flash memories, for example, in production lot unit (That is, key management information FKBv is also information not only prepared uniquely for each of NAND flash memories 10, but also can be commonly attached to (can be associated with) a plurality of NAND flash memories 10 such as the production lot unit of NAND flash memories 10 in accordance with the manufacturing process). Index information v of the key management information FKBv may be identification information or version number information of FKBv.

In contrast, encrypted secret identification information E-SecretID is data obtained by encrypting secret identification information attached uniquely to each of the NAND flash memories. Alternatively, the same encrypted secret identification information may be recorded in a plurality of NAND flash memories as usage. For example, in pre-recording content distribution, the same content data is recorded in NAND flash memories in advance to sell the NAND flash memories, and the same E-SecretID may be recorded in the NAND flash memories storing the content.

Hidden area 11-2 is an area inhibited from both reading and writing into from outside NAND flash memory 10 (Read/Program inhibit). In hidden area 11-2 of the present embodiment, secret key information NKeyi used by NAND flash memory 10 for an authentication process and secret identification information SecretID of NAND flash memory 10 are recorded.

ROM area 11-3 is an area inhibited from writing into from outside NAND flash memory 10, but is permitted to read data therefrom. In ROM area 11-3 of the present embodiment, index information v (index of FKey) to indicate FKeyv hidden by the key management information FKBv stored in area 11-1, and index information i (index of NKey) to indicate the secret information NKeyi stored in area 11-2 are recorded. In the present embodiment, data is generally recorded after an error correction code being attached so that, even if an error occurs in data when the index information i or the index information v is recorded, correct identification information can be read. However, error correction encoding and decoding processes are not specifically illustrated.

Data cache (Data Cache) 12A, 12B, and 12C temporarily stores data read from cell array 11.

Data generators (Generate) 13, 14 are circuits that generate output data from a plurality of pieces of input data by a preset operation.

Data generator 13 generates secret information HKeyi,j by converting a host constant HCj received from host device 20 by using the above secret information NKeyi. Data generator 14 generates a session key SKeyi,j by converting a random number RNh received from host device 20 by using HKeyi,j. Data generators 13, 14 can be implemented as hardware (circuit), software, or a combination of hardware and software. When data generators 13, 14 are implemented as circuits, the same circuit as one-way converter 15 described below, a circuit diverting the one-way converter, or an Advanced Encryption Standard (AES) encryptor can be used as the data generators 13, 14 to make the circuit size smaller as a whole. Similarly, the same circuit can be used repeatedly for two data generators 13, 14 illustrated as different structural elements to make the data processing procedure easier to understand.

One-way converter (Oneway) 15 performs a one-way conversion on input data and key data input separately to output one-way converted input data. One-way converter 15 can be implemented as hardware, software, or a combination of hardware and software. One-way converter 15 may be implemented as a circuit. In the present embodiment, one-way converter 15 converts SecretID read from hidden area 11-2 by a one-way function using SKeyi,j generated by data generator 14 to generate one-way conversion identification information Oneway-ID (=Oneway(SKeyi,j, SecretID)). Oneway ID may be also referred to as "authentication information" herein. When implemented as a circuit, one-way converter 15 can also be used as data generator 14 or the like to make, as described above, the hardware circuit size smaller as a whole.

Though not shown, an output unit to output data to the host device 20 via controller 19 and like may be arranged as structural elements, if necessary.

1-2. Host Device

As shown in FIG. 1, host device 20 according to the present embodiment includes a decryptor (Decrypt) 21, an FKB processor (Process FKB) 22, a memory (Memory) 23, a random number generator (RNG) 24, a selector (Select 2) 25, a data generator (Generate) 26, a one-way converter (Oneway) 27, a data verification unit (Verify) 28, switch unit 29, and the like. In addition, for example, an error correction processing unit and the like may be included if necessary.

Decryptor (decryption circuit) 21 reads E-SecretID from NAND flash memory 10 (via controller 19). Then, decryptor decrypts the read data with key data FKey input separately to output decrypted read data. In the present embodiment, decryptor 21 decrypts E-SecretID selected by selector (Select1) 22-1 with FKey hidden by host device 10 as key information to obtain SecretID.

FKey processor (Process FKB: FKey decryption circuit) 22 decrypts key data FKey by using family key block FKBv read from NAND flash memory 10, identification key information IDKeyk, and index information k of IDKeyk hidden in memory 23 and outputs key data FKey to decryptor 21. In this manner, FKey suitable to NAND flash memory 10 storing SecretID is decrypted. In the present embodiment, FKey processor 22 includes a data selector (Select1) 22-1 and a decryptor (Decrypt) 22-2.

Data selector (Select1) 22-1 in the first stage selects data from encrypted FKey pack (FKBv) read from NAND flash memory, and outputs the selected data to decryptor 22-2. The selected data can be decrypted with identification key information hidden in memory 23 with index information k.

Decryptor (Decrypt) 22-2 decrypts data selected by data selector 22-1 by using IDKeyk hidden in memory 23 by host device 20 and outputs generated key data FKey to decryptor 21.

Memory 23 records index information k, identification key information IDKeyk, set of secret key information $HKey_{i,j}$ (i=1, ..., m; j is a fixed value for $HKey_{i,j}$), and host constant HCj and hides at least IDKeyk and set of $HKey_{i,j}$ (i=1, ..., m) from outside of host device 20. Host constant HCj (base information) is a constant held in host device 20 in advance to be sent to NAND flash memory 10 when authentication is requested (Request authentication). Details thereof will be described below.

Random number generator (RNG) 24 generates and outputs a random number RNh used for an authentication process.

Data selector (Select2) 25 in the second stage selects secret information $HKey_{i,j}$ needed for the authentication process with NAND flash memory 10 from the set of $HKey_{i,j}$ (i=1, ..., m; j is a fixed value for $HKey_{i,j}$) hidden by host device 20 by using index information i read from data cache 12C of NAND flash memory 10.

Data generator (Generate) 26 is an operation unit that generates output data by performing a predetermined operation on a plurality of pieces of input data. In the present embodiment, data generator 26 generates a session key $SKey_{i,j}$ by converting RNh generated by host device 20 by using $HKey_{i,j}$ hidden by host device 20. Data generator 26 may be use, for example, the above AES encryption operation.

The one-way converter (Oneway) 27 converts SecretID output from decryptor 21 by a one-way function using $SKey_{i,j}$ output from data generator 26 to generate one-way conversion identification information Oneway-ID.

When host device 20 is a consumer device, secret information IDKeyk and $HKey_{i,j}$ is encrypted by a method specific to the manufacturer, and then the decrypted information is stored in an internal dedicated memory. When host device 20 is a software program, IDKey and $HKey_{i,j}$ is protected from a dishonest analysis by tamper resistant software (TRS) technology, and stored in a memory. Alternatively, when host device 20 includes a security module, IDKey and $HKey_{i,j}$ is hidden by the security module.

The data verification unit (Verify) 28 compares Oneway-ID received from NAND flash memory 10 and Oneway-ID obtained from one-way converter 27 in host device 20 to determine whether both Oneway-IDs match. If both values of the one-way conversion identification information Oneway-IDs match (OK), data verification unit 28 judges that SecretID obtained by decryptor 21 is an authentic SecretID and delivers the obtained SecretID to subsequent processes. On the other hand, if both values thereof do not match (NG), data verification unit 28 judges that the SecretID is an illegitimate SecretID and outputs a message to that effect to subsequent processes.

Switch unit 29 turns on a signal path to output SecretID if a determination result when both values of Oneway-IDs match in data verification unit (Verify) 28 (OK) is input to unit 29 as a control signal.

Controller (Controller) 19 performs data transfer with host device 20 by controlling NAND flash memory 10. Details of controller 19 are described later.

The configuration example of the memory system is not limited to the one described above. For example, an error correction processing unit (not shown) and other structural elements may be included if necessary.

<2. Authentication Flow>

Next, the authentication flow of a memory system according to the first embodiment will be described along FIG. 2.

(Step S11)

When the authentication is started (Start), host device 20 reads an encrypted FKey pack (FKB: Family Key Block), which is key management information, and encrypted SecretID (E-SecretID) from NAND flash memory 10.

(Step S12)

Subsequently, host device 20 reads encrypted FKey data that can be decrypted by host device 20 by executing a data selection process by data selector (Select 1) 22-1 from the read FKB and also obtains key data FKey by decrypting the encrypted FKey by decryptor 22-2 with hidden secret information IDKeyk. Further, host device 20 obtains secret identification information SecretID by decrypting E-SecretID read from NAND flash memory 10 with the obtained FKey.

(Step S13)

Subsequently, host device 20 generates a random number RNh needed for an authentication request. By using RNh for the authentication process, a common key that is different each time can be used with the NAND flash memory 10 for processes below.

(Step S14)

Subsequently, host device 20 sends out host constant HCj held in advance and random number RNh to NAND flash memory 10 along with the an authentication request (Request authentication).

(Step S15)

Subsequently, NAND flash memory 10 loads NKeyi (i=1, ..., m) from hidden area 11-2, which are stored in the data cache 12B.

(Step S16)

Subsequently, NAND flash memory 10 reads index information i, stores the index information i in data cache 12C, and transmits the index information i to host device 20. The index information i is needed by host device 20 to select $HKey_{i,j}$ from set of $HKey_{i,j}$ (i=1, ..., m) for authentication with NAND flash memory 10.

(Step S17)

Subsequently, host device 20 selects $HKey_{i,j}$ from the set of $HKey_{i,j}$ (i=1, ..., m) hidden in advance, by using the received index information i. The selected $HKey_{i,j}$ is needed for the authentication process with NAND flash memory 10

(Step S18)

In parallel with step S17, NAND flash memory 10 generates HKeyi,j by a data generation process of data generator 13 using hidden NKeyi and received host constant HCj. Further, NAND flash memory 10 generates session key data SKeyi,j (=Generate(HKeyi,j, RNh)) by a data generation process of data generator 14 using received random number RNh.

(Step S19)

Subsequently, host device 20 generates session key data SKeyi,j (=Generate(HKeyi,j, RNh)) by a data generation process of data generator 26 using selected HKeyi,j and generated RNh.

(Step S20)

Subsequently, host device 20 transmits an ID request (Request ID) to NAND flash memory 10.

(Step S21)

Subsequently, NAND flash memory 10 reads secret identification information SecretID from hidden area 11-2 and stores SecretID in data cache 12A.

(Step S22)

Subsequently, NAND flash memory 10 generates authentication information Oneway-ID (=Oneway(SKeyi,j, SecretID)) by one-way conversion processing of SecretID with generated SKeyi,j by one-way converter 15, and transmits generated Oneway-ID to host device 20.

(Step S23)

Subsequently, host device 20 performs one-way conversion processing of SecretID with generated SKeyi,j by one-way converter 27 to obtain authentication information Oneway-ID.

(Step S24)

Subsequently, host device 20 determines whether Oneway-ID received from NAND flash memory 10 and Oneway-ID generated by host device 20 match. When both values of Oneway-IDs match (OK), host device 20 judges that SecretID obtained by decryptor 21 is an authentic ID and delivers the SecretID to subsequent processes. On the other hand, if both values thereof do not match (NG), host device 20 judges that the SecretID is an illegitimate ID and outputs a message to that effect.

(Step S25)

Subsequently, host device 20 outputs the result of above step S24 (Output).

With the above operation, the authentication flow according to the first embodiment is completed (End).

<3. FKB (Family Key Block)>

Figure 3:
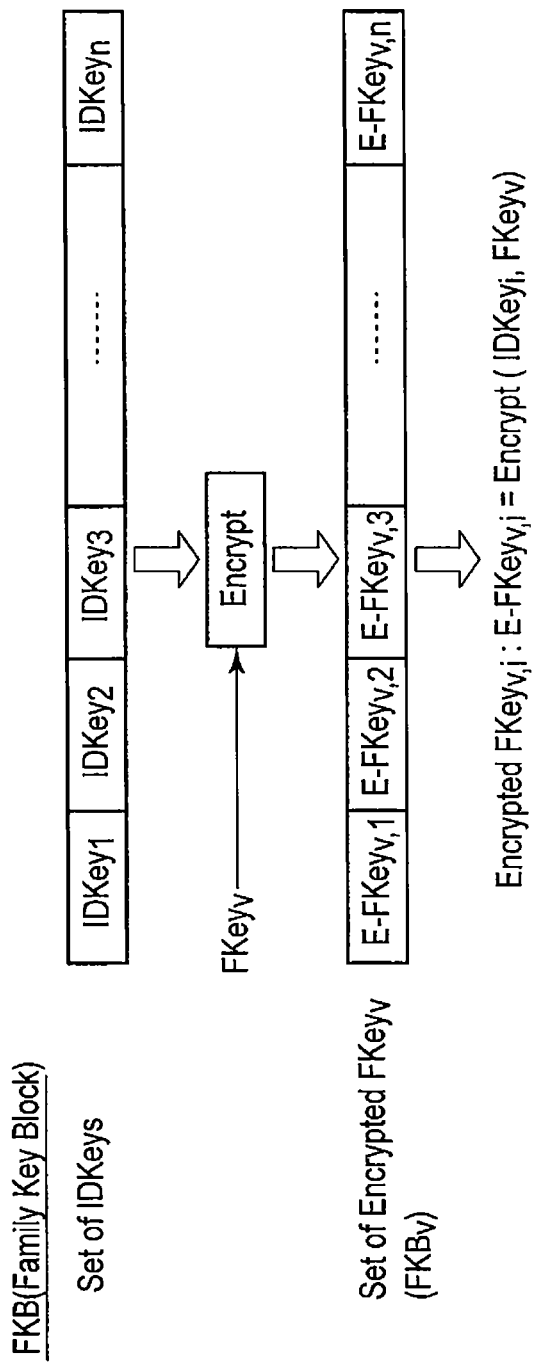
FIG. 3 is a diagram showing a configuration example of an encrypted FKey pack (FKB) according to the first embodiment.

Next, key management information FKB (Family Key Block) according to the first embodiment will be described in more detail by using FIG. 3.

To generate key management information FKB (family key block) conforming to NAND flash memory 10 in which secret identification information SecretID is recorded, one piece of FKeyv after another is encrypted (Encrypt) by using one IDKeyi (i=1, . . . , n) (Set of IDKeyi's) after another as secret key information prepared in advance. That is, FKB is a set of encrypted FKeyv (E-FKeyv,i)=Encrypt (IDKeyi, FKeyv) and the set of encrypted FKeyv is called an encrypted FKey pack.

Incidentally, FKB is not limited to the configuration in the present embodiment. For example, in case where the specific IDKeyi is leaked, encrypted FKeyv (E-FKeyv) which can be decrypted with the leaked IDKeyi is deleted from the FKB. As a result, when host device 20 holding the leaked IDKeyi accesses NAND flash memory storing the newly configured FKB, host device 20 can not obtain (decrypt) correct FKeyv and SecredID. In this manner, the function to revoke host device 20 holding the leaked secret information IDKeyi can be provided.

Figure 4:
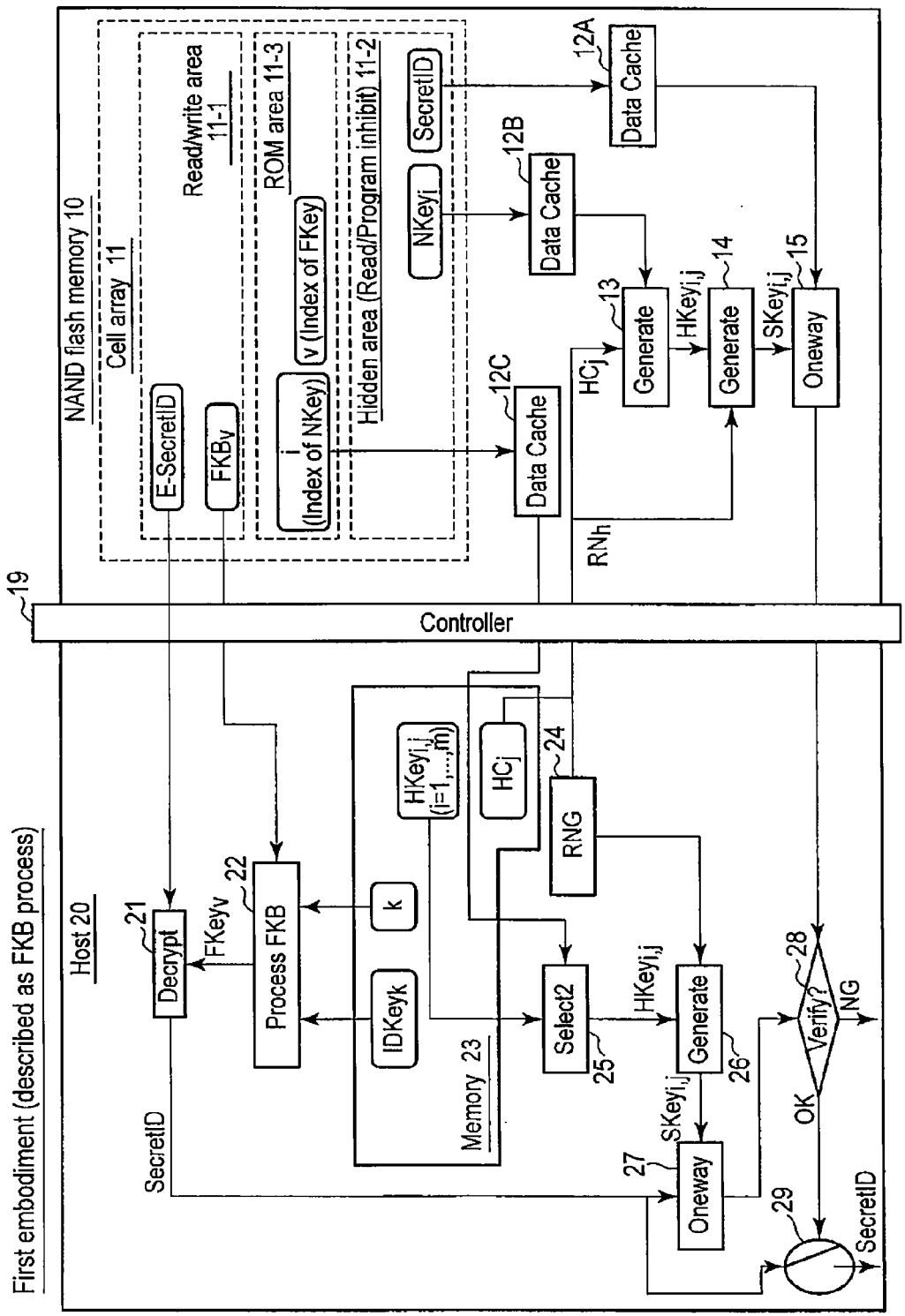
FIG. 4 is a block diagram showing a configuration example of the memory system according to the first embodiment.

Further, the method of generating key management information FKB is not limited to the method in the present embodiment. For example, the function to revoke host device 20 can also be provided if key management information FKB is generated by using conventional MKB (Media Key Block) technology used in CPRM or another MKB technology. When the MKB technology is applied, for example, a configuration example of the memory system is shown like in FIG. 4. The shown memory system is different from the memory system in FIG. 1 in that FKB processor (Process FKB) 22 is shown as a superordinate concept.

The MKB technology efficiently shares common secret information (Media Key) (among devices not to be revoked) while realizing device revocation in a situation in which each of a plurality of devices has a mutually different piece of secret information and is also called Broadcast Encryption.

<4. Writing Secret Information and FKB>

Next, writing secret information or key management information FKB into NAND flash memory 10 will be described.

4-1. When Writing Secret Information or Key Management Information FKB During Manufacture of the NAND Flash Memory First, a case where secret information or FKB is written, for example, during manufacture of NAND flash memory 10 will be described by using FIG. 5.

Licensing administrator 40 generates data below: FKBv (v=1, . . . , n), FKeyv(v=1, . . . , n), v (v=1, . . . , n), NKeyi, and i. FKBv is generated by, as described above, encrypting FKeyv. In addition, v may be a plurality of values. When, for example, licensing administrator 40 generates three values of 1, 2, and 3 as v, the licensing administrator 40 generates (FKB1, FKey1), (FKB2, FKey2), and (FKB3, FKey3) in accordance with the generated v.

Subsequently, of the generated data, licensing administrator 40 delivers FKeyv(v=1, . . . , n), v(v=1, . . . , n), NKeyi, and i to memory vendor 30. For the delivery the data, for example, licensing administrator 40 uses safe means such as sending the data to memory vendor 30 after the data being encrypted by using a public key of memory vendor 30 obtained in advance.

In memory vendor 30, there are selectors 32, 33, a generator 34, and an encryption unit 35, in addition to the NAND flash memory 10. Memory vendor 30 further holds data 31 such as FKBv (v=1, . . . , n) delivered by licensing administrator 40.

With the above configuration, memory vendor 30 selects one of the values of v by selector 32, and writes the selected value of v into ROM area 11-3 as an index of NKey.

Further, memory vendor 30 writes a value of i (index of NKey) and a value of NKeyi into ROM area 11-3 and hidden area 11-2 of NAND flash memory 10, respectively.

Memory vendor 30 generates secret identification information SecretID by generator (SecretID Generator) 34. Further selector 32 selects FKeyv corresponding to the selected v. Memory vendor 30 decrypts the generated SecretID with the selected FKeyv to generate encrypted secret identification information E-SecretID.

Further, memory vendor 30 writes a value of the SecretID and a value of E-SecretID into hidden area 11-2 and read/write area 11-1 of NAND flash memory 10, respectively.

With the above operation, predetermined secret information and FKB can be written during manufacture of the NAND flash memory 10. Regarding the order of writing each of the above values, E-SecretID is a value obtained after an encryption process and can be written after the encryption process by the encryption unit 35. Otherwise, there is no restriction on the order of writing operation and the values may be written in an order different from the order of the above example.

Further, memory vendor 30 delivers NAND flash memory 10 for which the write process is completed to a card vendor.

Thus, in the present embodiment, NAND flash memory 10 can be in a state in which index information v (index of FKey) or the like is already written.

4-2. When FKB is Written by the Card Vendor

Figure 6:
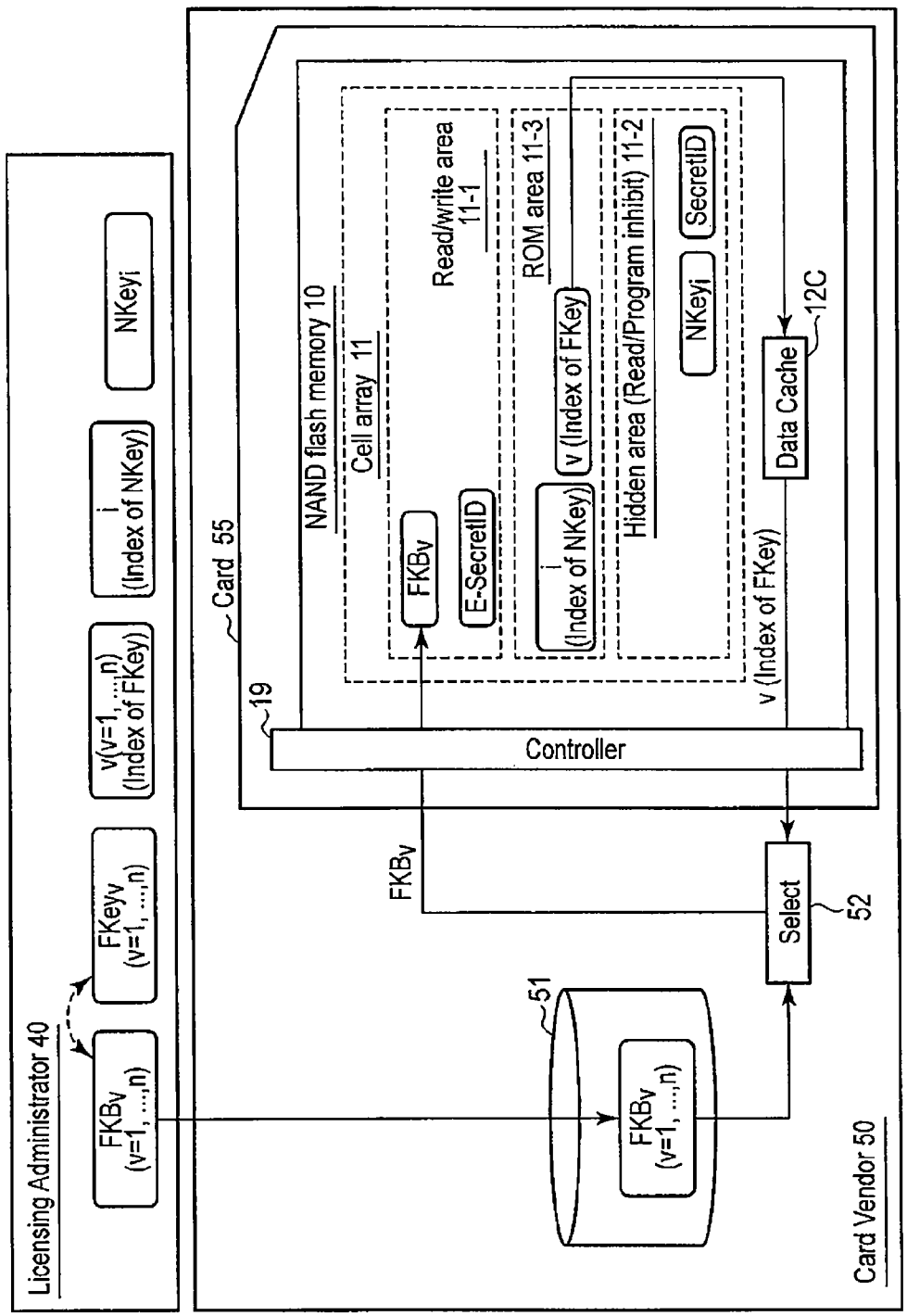
FIG. 6 shows an example flow of writing process of FKB by a card vendor according to the first embodiment.

Next, a case where a card vendor 50 writes FKB will be described by using FIG. 6.

Card vendor 50 receives NAND flash memory 10 to which the predetermined information v and the like have been written from memory vendor 30. Then, card vendor 50 manufactures storage media (here, Card) 55 for general users like, for example, SD cards by connecting the controller 19 that controls the NAND flash memory 10.

In card vendor 50, there is a selector 52, in addition to the storage media (Card) 55 and data (FKBv) 51 received from licensing administrator 40.

The process to write key management information FKBv by the card vendor 50 is as follows.

First, card vendor 50 receives FKBv from licensing administrator 40 as data 51. For the delivery of data 51, the above-described safe means is used.

Then, card vendor 50 reads the value of the index information v recorded in ROM area 11-3 of NAND flash memory 10 into data cache 12C or the like (via controller 19).

Subsequently, card vendor 50 selects FKBv corresponding to the value of the read index information v by selector 52, and writes the selected FKBv into read/write area 11-1 of NAND flash memory 10 via controller 19.

<Advantageous Effects>

According to the authenticator, authenticate, and authentication method according to the first embodiment, at least the following advantageous effects (1) to (3) can be obtained.

(1) Even if secret information has leaked from host device 20, it is possible to prevent illegitimate use of secret information of NAND flash memory 10 using the leaked information.

Host device 20 as an authenticator may be provided not only as a dedicated hardware device such as a consumer device, but also, for example, as a program executable in a PC or the like, and, in some cases, the software functions as a substantial host device. On the other hand, NAND flash memory 10 as an authenticatee is recording media. Even in the case where a program called "firmware" mediates, an important process or information is stored in a hidden state in hardware in the cell array 11.

Thus, there is concern that the tamper-resistance (the resistance to attacks) of software executed in a PC becomes lower, compared to the recording media. Thus, there is concern that, by attacking host device (authenticator) 20 with a low tamper-resistance, secret information hidden in NAND flash memory (authenticatee) 10 with a high tamper-resistance is also exposed, leading to a disguise as a device with a high tamper-resistance.

Thus, in the configuration according to the first embodiment and the authentication method therefor, as described above, NAND flash memory 10 with a relatively high tamper-resistance hides first key information (NKeyi) that can generate second key information (HKeyi,j) therefrom in cell array 11. On the other hand, host device 20 hides only second key information (HKeyi,j) that cannot generate first key information (NKeyi) therefrom in memory 23.

Thus, NAND flash memory 10 generates second key information (HKeyi,j) hidden by authenticator 20 by using host constant HCj received from host device 20 and first key information (NKeyi) hidden by NAND flash memory 10. NAND flash memory 10 further generates session key (SKeyi,j) by using second key information (HKeyi,j) and random number RNh.

Host device 20 generates session key (SKeyi,j) by using second key information (HKeyi,j) selected by index information i and random number (RNh). As a result, NAND flash memory 10 and host device 20 share the same session key (SKeyi,j).

Thus, in the present embodiment, the secret level of information hidden by NAND flash memory (authenticatee) 10 and the secret level of information hidden by host device (authenticator) 20 can be made asymmetric. In the present embodiment, for example, the secret level of information hidden by NAND flash memory 10 with a relatively high tamper-resistance can be set higher than the secret level of information hidden by host device 20 with a relatively low tamper-resistance.

Thus, even if information hidden by host device 20 has leaked, NAND flash memory 10 cannot be "disguised" by using the leaked information because the secret level of information hidden by NAND flash memory 10 with a relatively high tamper-resistance is higher. Therefore, illegitimate use of secret information of NAND flash memory 10 by using the leaked information can advantageously be prevented. As a result, for example, it becomes possible to reliably determine that ID information read from host device 20 is information that has been read from the intended authenticatee 10 and to revoke illegitimate use thereof by remote parties.

(2) Advantages for Implementation

In a configuration like the present embodiment, restrictions are also imposed on circuit scales, for example, in an environment in which hardware implementation of a public key cryptosystem process or an MKB process, which requires a relatively large circuit scale, is difficult to achieve. That is, a relatively large scale circuit is required for a public key cryptosystem process or an MKB process. On the other hand, a circuit area has been limited and hardware implementation has been difficult.

However, according to the present embodiment, though the key information is asymmetric, there is no need to use the public key cryptosystem process requiring a relatively large circuit scale. Further, by making the secret levels of information hidden by host device (authenicator) 20 and NAND flash memory (authenticatee) 10 asymmetric as described above, authentication means is implemented by which with information leaked from one device alone, the other device cannot be disguised, and session key SKeyi,j is shared by the authenticator 20 and the authenticatee 10.

Thus, implementation can be said to be advantageous even in a severe environment in which the above restrictions are imposed.

Further, as described above, the circuit scale can be further reduced by making processes of the data generator the same as those of the encryptor in a memory system.

(3) The manufacturing process can advantageously be simplified and manufacturing costs can be reduced.

NAND flash memory 10 according to the present embodiment stores in read/write area 11-1 key management information (FKBv) unique to each of NAND flash memories 10 in accordance with uses thereof or common to a plurality of NAND flash memories 10 in units of the production lot or the like. Further, NAND flash memory 10 according to the present embodiment stores in read/write area 11-1 encrypted secret identification information (E-SecretID) attached uniquely to each of NAND flash memories 10.

When key management information (FKBv) is made common in units of the production lot, unique information that needs to be recorded in each of the NAND flash memories 10 can be reduced to small data in data size such as the encrypted secret identification information (E-SecretID). In other words, the data size of unique encrypted secret identification information (E-SecretID) to be written into NAND flash memories 10 can be reduced by dividing information to be written into commonly attached key management information (FKBv) and unique encrypted secret identification information (E-SecretID) and encrypting the information in two stages.

Figure 5:
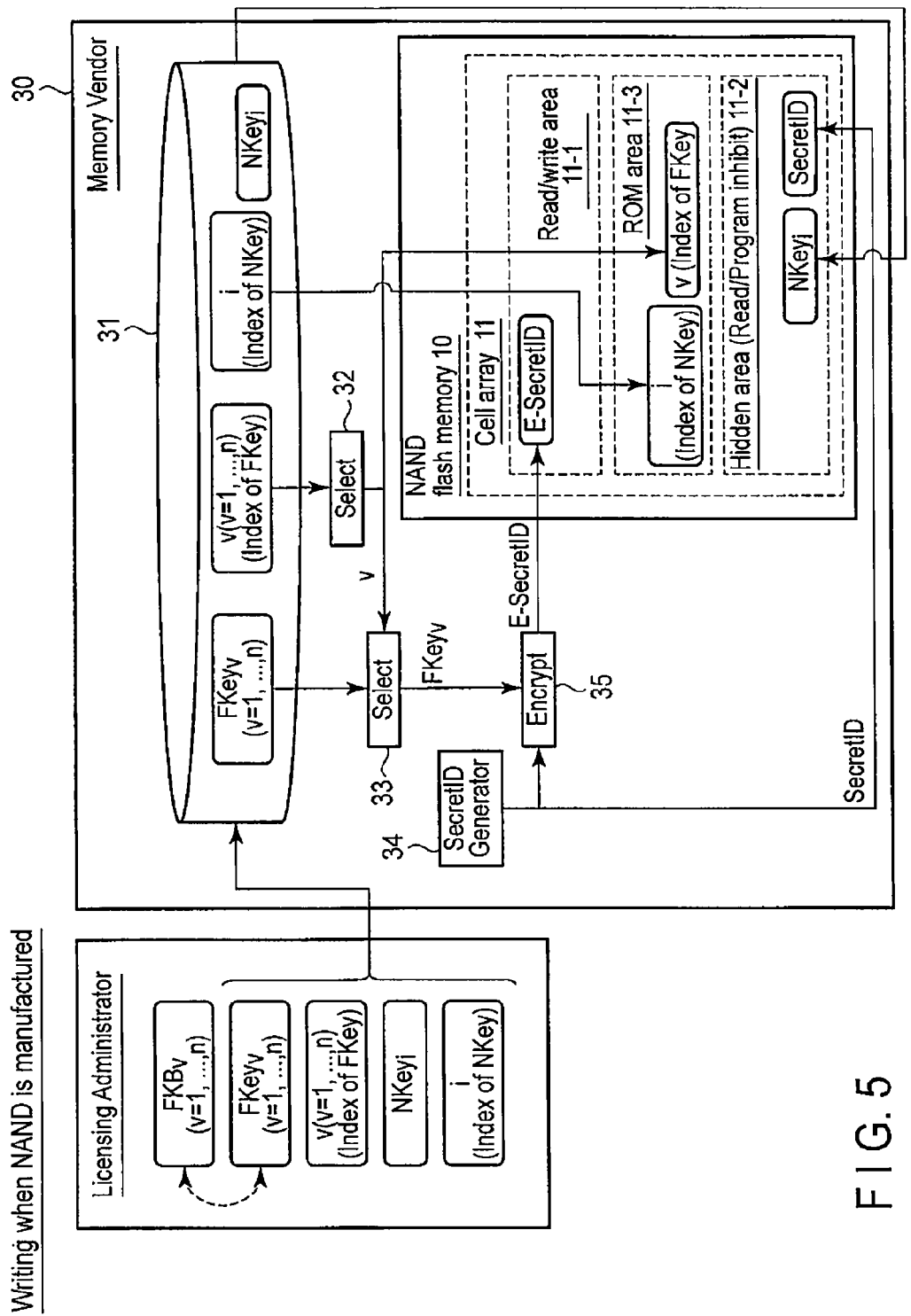
FIG. 5 is a diagram illustrating a write process of secret information by a NAND manufacturer according to the first embodiment.

For example, as shown in FIG. 5 above, memory vendor 30 writes unique information (E-SecretID) into each of the NAND flash memories 10 received from licensing administrator 40 during manufacture of the NAND flash memories.

Encrypted key management information (FKBv) commonly attached to NAND flash memories 10 can commonly be written into NAND flash memories 10 by card vendor 50. For example, as shown in FIG. 6 above, card vendor 50 writes the common key management information FKBv to each of NAND flash memories 10 received from licensing administrator 40. Thus, the size of unique data that must be written into each of NAND flash memories 10 by memory vendor 30 can be reduced.

When information unique to NAND flash memory 10 and whose data size is large is written during manufacture of NAND flash memories 10, the manufacturing process will be more complex and the manufacturing time will be longer, leading to increased costs of manufacturing. According to the configuration and method in the present embodiment, however, such a complex manufacturing process becomes unnecessary by dividing information to be written into commonly attached key management information FKBv and unique encrypted secret identification information (E-SecretID) and encrypting the information in two stages and therefore, the manufacturing process can advantageously be simplified and manufacturing costs can be reduced. Moreover, the manufacturing time can be shortened, offering advantages of being able to reduce power consumption.

Also on the side of host device 20, advantages similar to those of NAND flash memory 10 can be gained by adopting a configuration of generating E-SecretID by encrypting SecretID, which is a unique value to NAND flash memory by using FKey and further generating FKB by encrypting FKey with IDKeyk.

First Modification

When FKB is Downloaded and Written Later

An authenticator, an authenticatee, and an authentication method according to a first modification will be described. In the description, overlapping points with the first embodiment will be omitted.

<Writing FKB>

Writing an encrypted FKey pack (FKB) will be described.

The process in the first modification is a process that is not particularly needed if encrypted FKey pack (FKB) is written during manufacture of NAND flash memory 10. However, the process relates to a write process of FKB needed when NAND flash memory 10 and controller 19 are connected and NAND flash memory 10 is acquired by a general user as a storage device, for example, an SD card, and FKB is written later on the market when the card is used.

Figure 7:
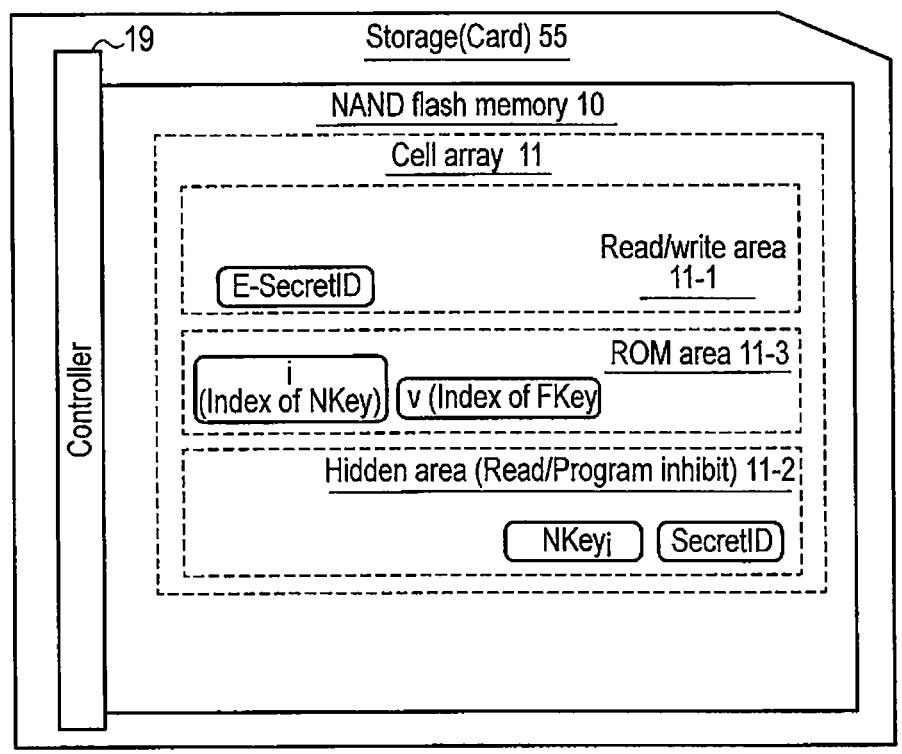
FIG. 7 is a diagram showing an authenticatee according to a first modification.

FIG. 7 shows a state in which key management information FKB is, as described above, recorded in the unrecorded storage media (Card) 55.

As shown in FIG. 7, NAND flash memory 10 is in a state in which NKeyi and SecretID are recorded in hidden area 11-2, index information i needed to identify the NKeyi and index information v needed to identify FKB are recorded in ROM area 11-3, and E-SecretID which is SecretID encrypted with FKeyv specified by index information v recorded in ROM area 11-3 is recorded in read/write area 11-1. The first modification is different from the first embodiment in that the FKB is not recorded in NAND flash memory 10.

Next, a case where FKB is, as described above, downloaded from a server and recorded in the unrecorded storage media 55 will be described by using FIG. 8.

Figure 8:
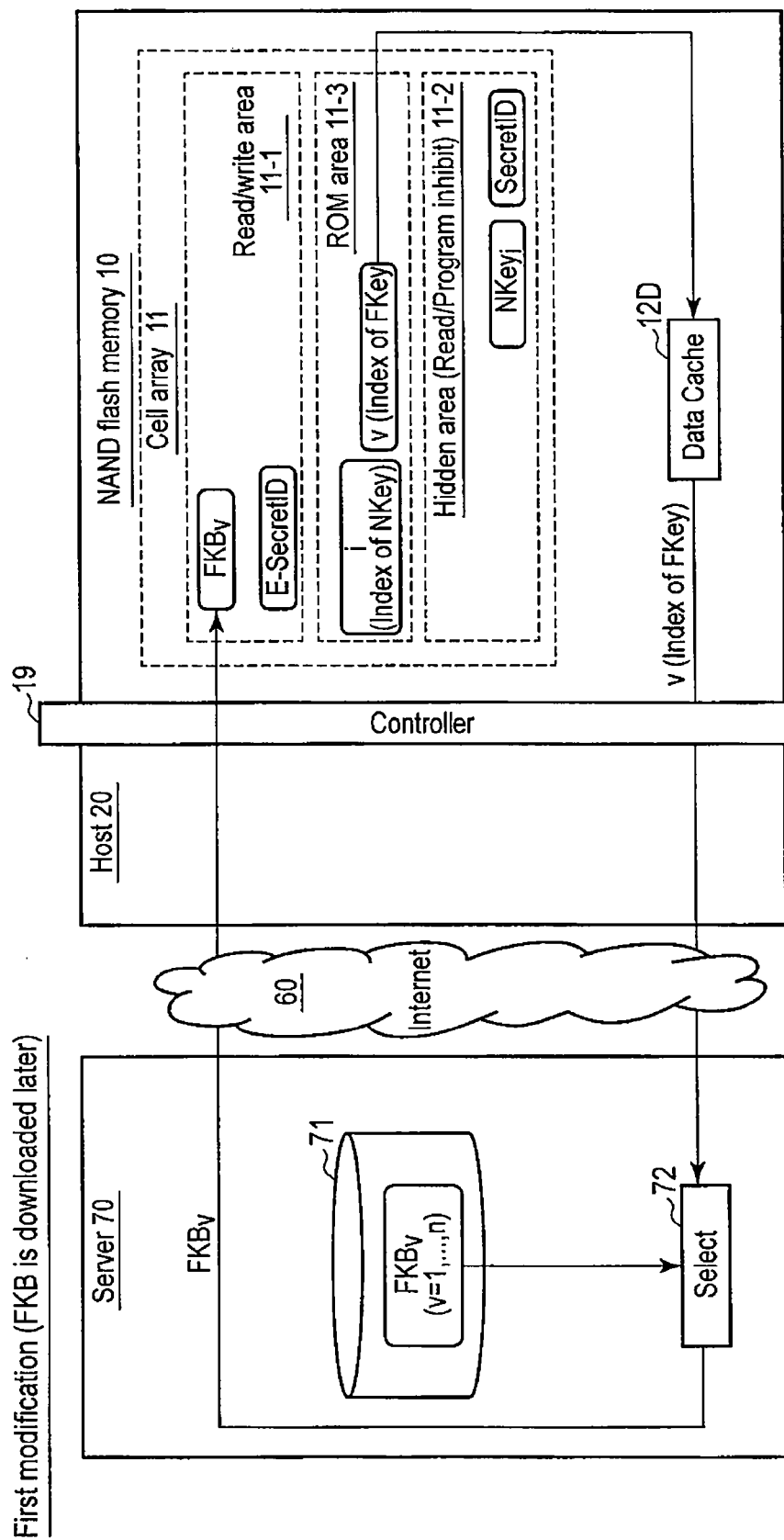
FIG. 8 is a block diagram showing a system downloading FKB according to the first modification.

In this case, as shown in FIG. 8, data cache 12D is provided in NAND flash memory 10 if necessary.

Server 70 according to the present embodiment includes an FKB data base (Set of FKBi's (i=1, ..., x)) 71 and a selector 72 to select FKBv based on index information v.

Server 70 and the memory system (NAND flash memory 10, controller 19, and host device 20) are electrically connected for communication via an Internet 60.

Host device 20 includes a function to determine whether it is necessary to newly write FKB and to request FKB from the server if necessary.

<FKB Write Flow>

Next, the flow to download an encrypted FKey pack (FKB) from server 70 and to write FKB into NAND flash memory 10 will be described along FIG. 9.

(Step S51)

Figure 9:
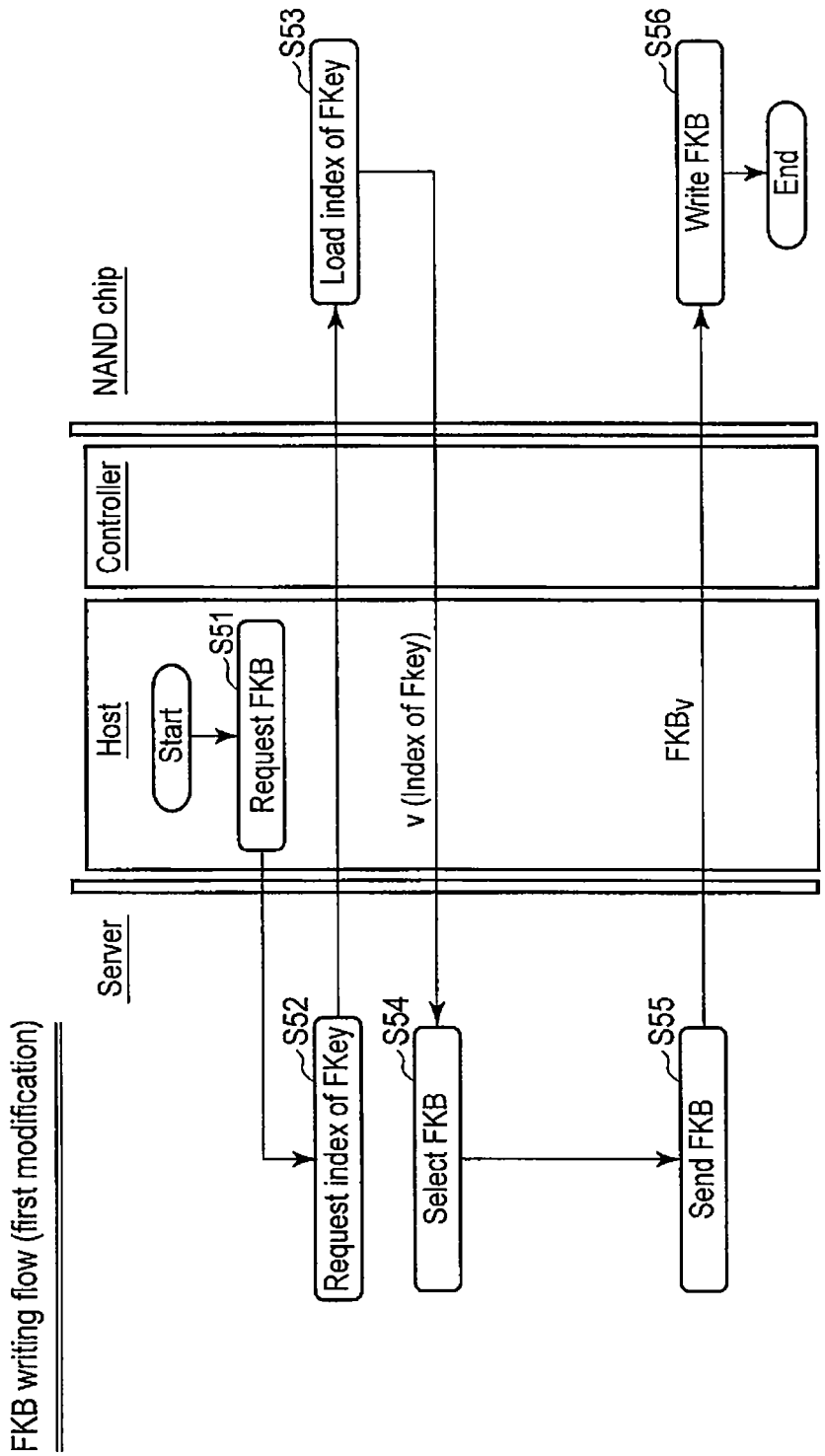
FIG. 9 is a flow chart showing a flow of downloading FKB according to the first modification.

First, as shown in FIG. 9, when host device 20 determines that it is necessary to download FKB, FKB writing is started and host device 20 issues an FKB request to server 70.

(Step S52)

Subsequently, server 70 requests index information v needed to identify FKeyv from NAND flash memory 10.

(Step S53)

Subsequently, NAND flash memory 10 reads v from ROM area 11-3 and sends out v to the server.

(Step S54)

Subsequently, server 70 selects FKBv corresponding to the received v from FKB database 71.

(Step S55)

Subsequently, server 70 sends out the selected FKBv to NAND flash memory 10.

(Step S56)

Subsequently, NAND flash memory 10 writes the received FKBv into read/write area 11-1 for recording.

With the above operation, the download flow of the encrypted FKey pack (FKB) according to the first modification is completed. (End).

Other configurations and operations are substantially the same as those in the first embodiment.

<Advantageous Effects>

According to the authenticator, authenticatee and authentication method according to the first modification, at least the advantageous effects (1) to (3) similar to those in the first embodiment can be obtained.

Further, according to the first modification, the present embodiment can be applied if necessary when FKB is written later.

Second Embodiment

Next, a second embodiment will be described. In the description, overlapping points with the first embodiment will be omitted.

In the first embodiment, after the authentication of NAND flash memory 10 by host device 20 is successfully completed, both share SecretID. As a process after the authentication, for example, host device 20 encrypts content and writes the encrypted content into NAND flash memory 10. For this process, using the shared SecretID can be considered.

The present embodiment intends to protect SecretID even in such a process. Thus, in the description, overlapping points with the first embodiment will be omitted.

<Memory System>

Figure 10:
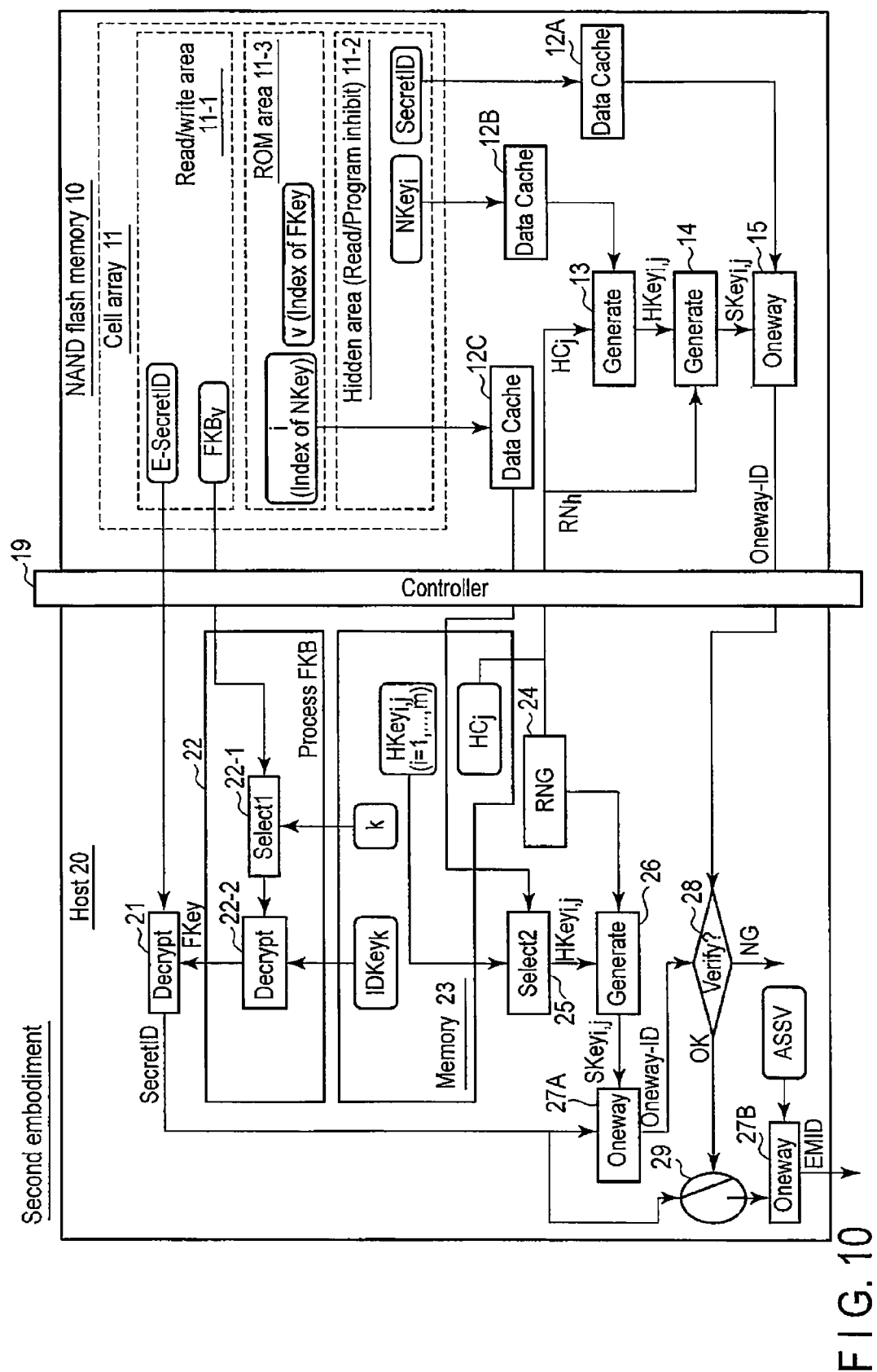
FIG. 10 and FIG. 11 are block diagrams showing configuration examples of memory systems according to second and third embodiments, respectively.

A memory system according to the second embodiment is shown as in FIG. 10.

As shown in FIG. 10, the memory system according to the present embodiment is different from that in the first embodiment in that the system further includes a one-way converter (Oneway) 27B, a switch unit 29, and information (ASSV) commonly held by all host devices 20 handling target content.

Switch unit 29 turns on a signal path to output SecretID to one-way converter 27B if a determination result when both values of Oneway-IDs match in a data verification unit (Verify) 28 (OK) is input as a control signal.

One-way converter (Oneway) 27B converts SecretID input from switch unit 29 by a one-way function using the information (ASSV) commonly held by all host devices handling target content to generate one-way conversion identification information EMID(EMID=Oneway(SecretID, ASSV)).

Thus, in the second embodiment, after SecretID being verified by host device 20, host device 20 converts SecretID using ASSV commonly held by all intended host devices to calculate EMID. Thus, host device 20 can execute the process of content encryption and the like by using EMID, instead of SecretID.

Other configurations and operations are substantially the same as those in the first embodiment and thus, a detailed description thereof is omitted.

<Advantageous Effects>

According to the authenticator, authenticatee and authentication method according to the second embodiment, at least the advantageous effects (1) to (3) similar to those in the first embodiment can be obtained.

Further, the second embodiment is different from the first embodiment in that host device 20 further includes one-way converter (Oneway) 27B, switch unit 29, and the information (ASSV) commonly held by all host devices handling target content.

According to the above configuration, after secret identification information SecretID being verified by host device 20, host device 20 converts secret identification information SecretID using the information (ASSV) commonly held by all intended host devices to calculate one-way conversion identification information EMID. Thus, host device 20 can execute the process of content encryption and the like by using one-way conversion identification information EMID, instead of secret identification information SecretID.

As a result, though not shown, one-way conversion identification information EMID can be used for content encryption in a postprocess and thus, secret identification information SecretID can be prevented from being leaked in the postprocess, further advantageously increasing confidentiality of secret identification information SecretID.

Third Embodiment

An Example of a Memory, a Controller, and a Host

Figure 11:
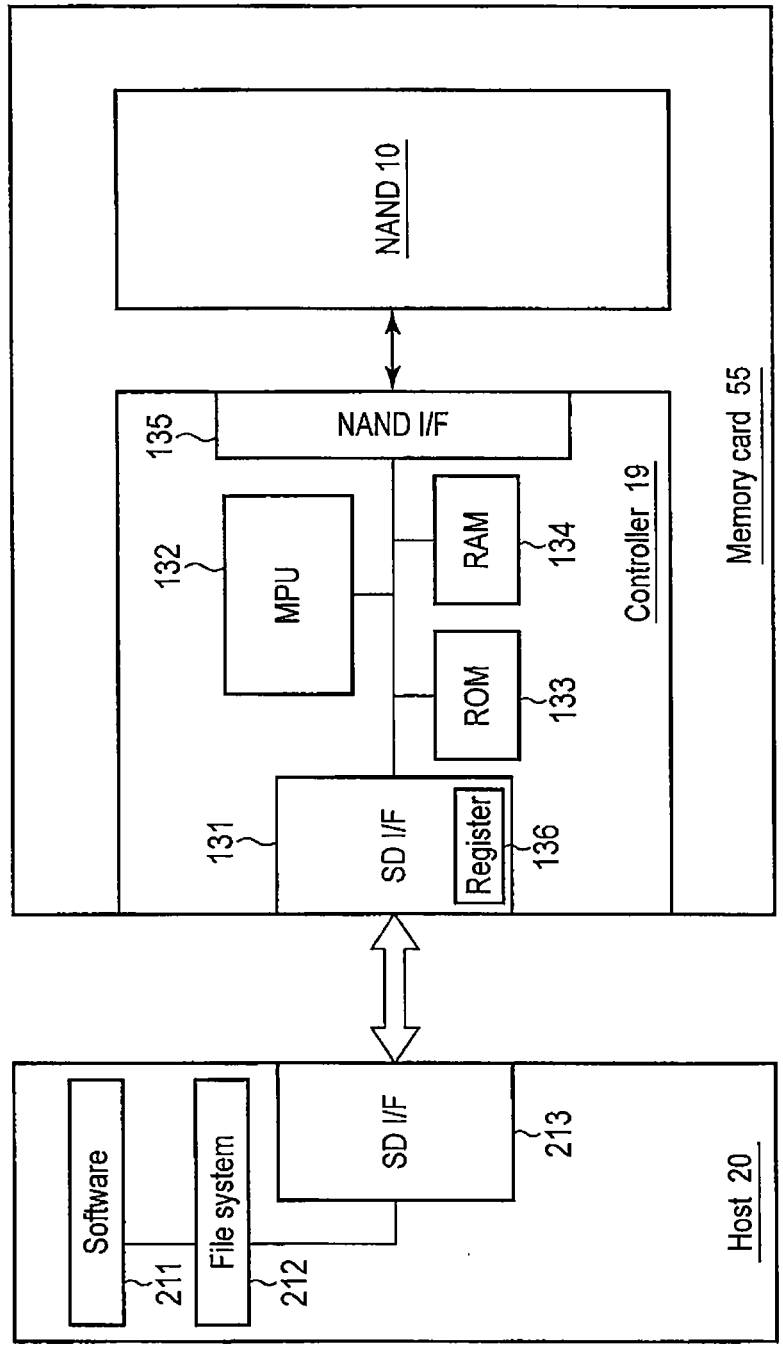

Next, referring to FIG. 11, a third embodiment is described. The third embodiment relates to an example of NAND flash memory 10, controller 19 and host device 20, which are applicable to the above-described embodiments. In this embodiment, an SD card (registered trademark) is taken as an example of a memory card.

As shown in FIG. 11, in this embodiment, functional blocks of host device 20, which is connected to memory card 55, are illustrated. The respective functional blocks can be realized by either hardware or computer software, or by a combination of both. Thus, the respective blocks are described, in general, from the standpoint of their functions, so as to clarify by which of them each block is realized. Whether such functions are executed as hardware or software depends on concrete modes of implementation or on design restrictions imposed on the entire system. A person skilled in the art may realize these functions by various methods in each concrete mode of implementation, but all methods of implementation fall within the scope of the present invention.

Host device 20 includes software 211 such as an application or an operating system. Software 211 is instructed by the user to write data in the memory card, or to read out data from the memory card. Software 211 instructs a file system 212 to write and read data. File system 212 is a scheme for managing file data which is recorded in a storage medium that is an object of management. File system 212 records management information in a memory area in the storage medium, and manages the file data by using the management information.

Host device 20 includes an SD interface 213. SD interface 213 includes hardware and software, which are necessary for executing an interface process between host device 20 and memory card 55. Host device 20 communicates with the memory card via SD interface 213. SD interface 213 specifies various protocols which are necessary for communication between host device 20 and memory card, and includes a set of various commands which are mutually recognizable by an SD interface 131 of the memory card, which will be described later. In addition, SD interface 213 includes a hardware structure (arrangement of pins, number of pins, etc.) which is connectable to SD interface 131 of the memory card.

The memory card 55 includes a NAND flash memory 10 and a controller 19 for controlling memory 10. The memory card 55 is connected to host 20, or when host 20 is turned on in the state in which memory card 55 is inserted in host 20 that is in the OFF state, memory card 55 is supplied with power, executes an initializing process, and executes a process corresponding to the access from host 20.

NAND memory 10 stores data in a nonvolatile state, and executes data write and read in a unit called "page" which includes a plurality of memory cells. In the above embodiments, through the NAND flash memory is taken as an example, the memory device is not limited to the NAND flash memory and any non-volatile memory devices may be widely used as the above-mentioned memory device. In that case, NAND flash memory 10 may be replaced with any non-volatile memory device, and the above-described memory cell array may be replaced with any non-volatile memory cell in this description. A unique physical address is allocated to each page. In addition, memory 10 executes erase of data in a unit called "block" (erase block) which includes a plurality of pages. In some cases, a physical address is allocated to a physical block unit.

Controller 19 manages the storage state of data by memory 10. The management of the storage state includes managing a relationship between a physical address of a page (or a physical block) and a logical address of data which is stored in this page, and managing which physical address is indicative of a page (or a physical block) that is in an erase state (a state in which no data is written or invalid data is stored).

Controller 19 includes an SD interface 131, an MPU (micro processing unit) 132, a ROM (read only memory) 133, a RAM (random access memory) 134, and a NAND interface 135.

SD interface 131 is composed of hardware and software, which are necessary for executing an interface process between host 20 and controller 19. Like SD interface 213, SD interface 131 specifies protocols which enable communication between both, includes a set of various commands, and also includes a hardware structure (arrangement of pins, number of pins, etc.). Memory card (controller 19) 55 communicates with host 20 via SD interface 131. SD interface includes a register 136.

MPU 132 controls the entire operation of memory card 55. For example, when memory card 55 is supplied with power, MPU 132 reads out firmware (control program), which is stored in ROM 133, into RAM 134, and executes a predetermined process. MPU 132 creates various tables on RAM 134 according to the control program, or executes a predetermined process on memory 10 according to a command which is received from host 20.

ROM 133 stores, e.g. a control program which is controlled by MPU 132. RAM 134 is used as a working area of MPU 132, and temporarily stores the control program or various tables. Such tables include a conversion table (logical/physical table) for converting a logical address allocated to data by file system 212 to a physical address of a page in which the data is actually stored. NAND interface 135 executes an interface process between controller 19 and memory 10.

Memory areas in NAND flash memory 10 include, for example, a user area (User area), a hidden area (Hidden area), a protected area (Protected area) and a ROM area (ROM area), as described above, in accordance with the kinds of data which is stored. Controller 19 secures a part of the user area, and stores control data (e.g. logical/physical table) which is necessary for the operation of controller 19 itself.

Fourth Embodiment

A Structure Example of NAND Flash Memory

Next, a 4th embodiment is described as a concrete structure example of the above-described NAND flash memory 10.
<Entire Structure Example>

Figure 12:
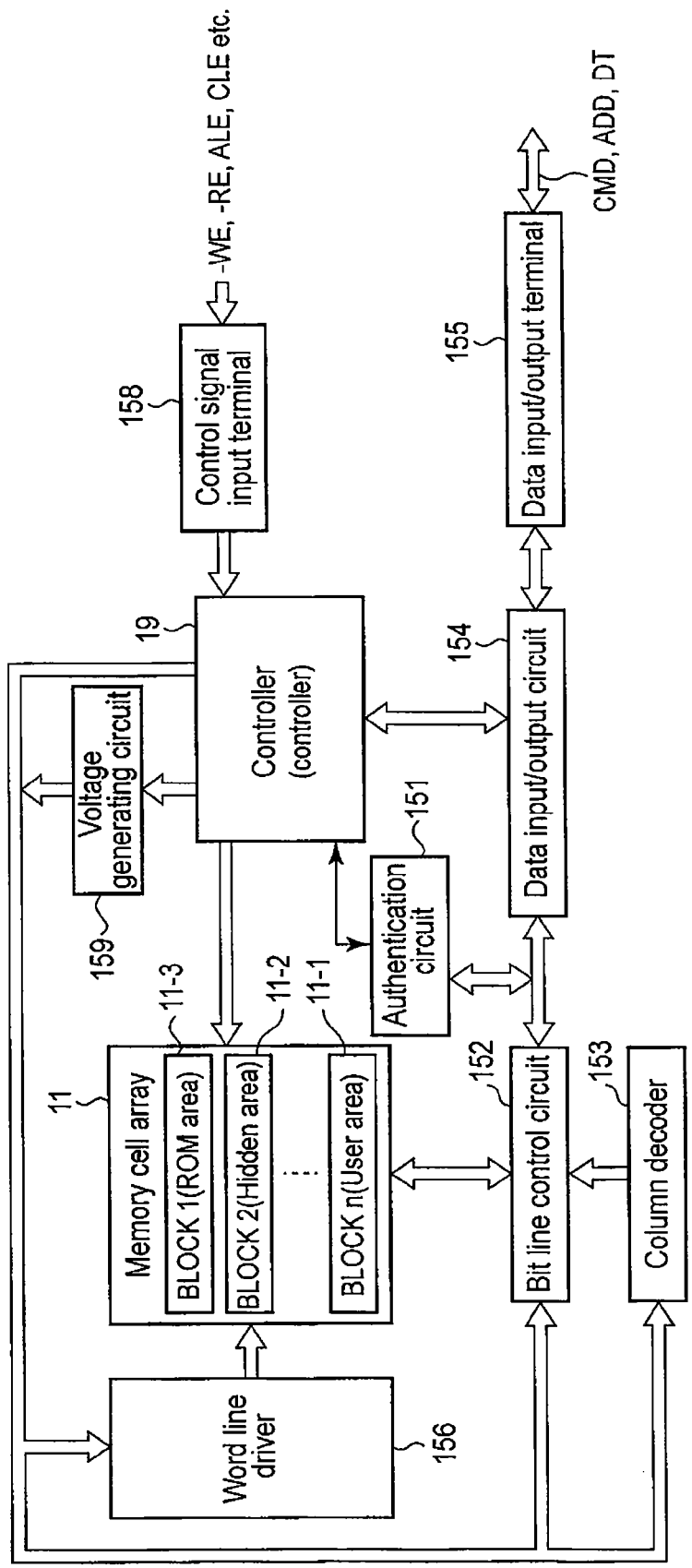
FIG. 12 is a block diagram showing a configuration example of a NAND flash memory according to a fourth embodiment.

FIG. 12 shows a concrete entire structure example of NAND flash memory 10.

As shown in FIG. 12, NAND flash memory 10 of this embodiment includes a memory cell array 11, a control circuit 19, an authentication circuit 151, a bit line control circuit 152, a column decoder 153, a data input/output buffer 154, a data input/output terminal 155, a word line driver 156, a control signal input terminal 158, and a voltage generating circuit 159.

Memory cell array 11 is composed of a plurality of blocks (BLOCK1 to BLOCKn). Each of the blocks (BLOCK1 to BLOCKn) includes a plurality of memory cells which are arranged at intersections between word lines and bit lines. For example, BLOCK1 is the above-described ROM area 11-3. For example, BLOCK2 is the above-described hidden area 11-2. The other blocks are, for example, user areas (User area) 11-1, which are accessible from host device 20.

ROM area 11-3 is, for example, an OTP (One Time Program) block, and only one-time write is permitted. After data write, a block decoder is controlled by using means such as an electric fuse, a laser fuse or a ROM fuse, thereby prohibiting an erase operation. Hidden area 11-2 is set in such a state that hidden area 11-2 cannot be selected by, for example, decoding with an external address. As a result, hidden area 11-2 is an area from which data can be read out by only control circuit 19 in NAND flash memory.

Authentication circuit 151 includes, for example, the above-described data caches 12A, 12B, and 12C, generators 13 and 14, one-way converter 15 and the like, and is controlled by controller 19.

Bit line control circuit 152 reads out data of a memory cell in memory cell array 11 via a bit line, and detects the state of a memory cell in memory cell array 11 via a bit line. In addition, bit line control circuit 152 applies a write control voltage to a memory cell in memory cell array 11 via a bit line, thereby writing data in the memory cell.

In bit line control circuit 152, a data memory circuit, such as a page buffer (not shown), is provided, and this data memory circuit is selected by column decoder 153. The data of the memory cell, which has been read out to the data memory circuit, is output to the outside from data input/output terminal 155 via data input/output buffer 154.

Data input/output terminal 155 is connected to, for example, external host device 20. A command CMD, an address ADD, and input/output data DT and the like is transmitted to and received from host device 2 through data input/output terminal 155. Data input/output terminal 155 has a bus width of, e.g. 8 bits or 16 bits. NAND flash memory 10 may support a high-speed interface standard such as a toggle mode interface. In the toggle mode interface, for example, data transfer is performed via data input/output terminal 155, in sync with both the rising and falling edges of a data strobe signal (DQS).

Host device 20 is, for example, a microcomputer, and receives data DT which is output from data input/output terminal 155. Host device 20 outputs various commands CMD (write command, read command, erase command, status read command, etc.) for controlling the operation of NAND flash memory 10, addresses ADD, and data DT. Write data DT, which has been input to data input/output terminal 155 from host device 20, is supplied via data input/output buffer 154 to the data memory circuit (not shown) which is selected by column decoder 153. On the other hand, commands CMD and addresses ADD are supplied to control circuit 19.

Word line driver 156, under the control of control circuit 19, selects a word line in memory cell array 11, and applies to the selected word line the voltage that is necessary for data read, write or erase.

Voltage generating circuit 159, under the control of control circuit 19, supplies necessary voltages for the operations of the various circuits connected to circuit 159, shown in the Figure. For example, voltage generating circuit 159 boosts an external voltage which is supplied from the host device, and generates a voltage which is applied to the word line at a time of data read, write or erase.

Controller 19 provides necessary control signals and control voltages to the various circuits connected to controller 19, thereby to control the operation of the entirety of NAND flash memory 10. Controller 19 is connected to memory cell array 11, authentication circuit 151, bit line controller 152, column decoder 153, data input/output buffer 154, word line driver 156, and voltage generating circuit 159. The above circuits connected to controller 19 are controlled by controller 19.

Controller 19 is connected to control signal input terminal 158, and is controlled by a combination of control signals, such as a WE (write enable) signal, a RE (read enable) signal, an ALE (address latch enable) signal, a CLE (command latch enable) signal, and the like which are input via control signal input terminal 158 from host device 20.

In terms of functions, word line driver 156, bit line control circuit 152, column decoder 153 and controller 19 constitute a data write circuit, a data read circuit, and a data erase circuit. Host device 20 detects whether NAND flash memory 10 is executing an internal operation, such as a write operation, a read operation or an erase operation, by monitoring an RY/BY (ready/busy) signal output terminal (not shown). Controller 19 outputs an RY/BY signal via the RY/BY signal output terminal.

<Structure Example of Block (BLOCK)>

Figure 13:
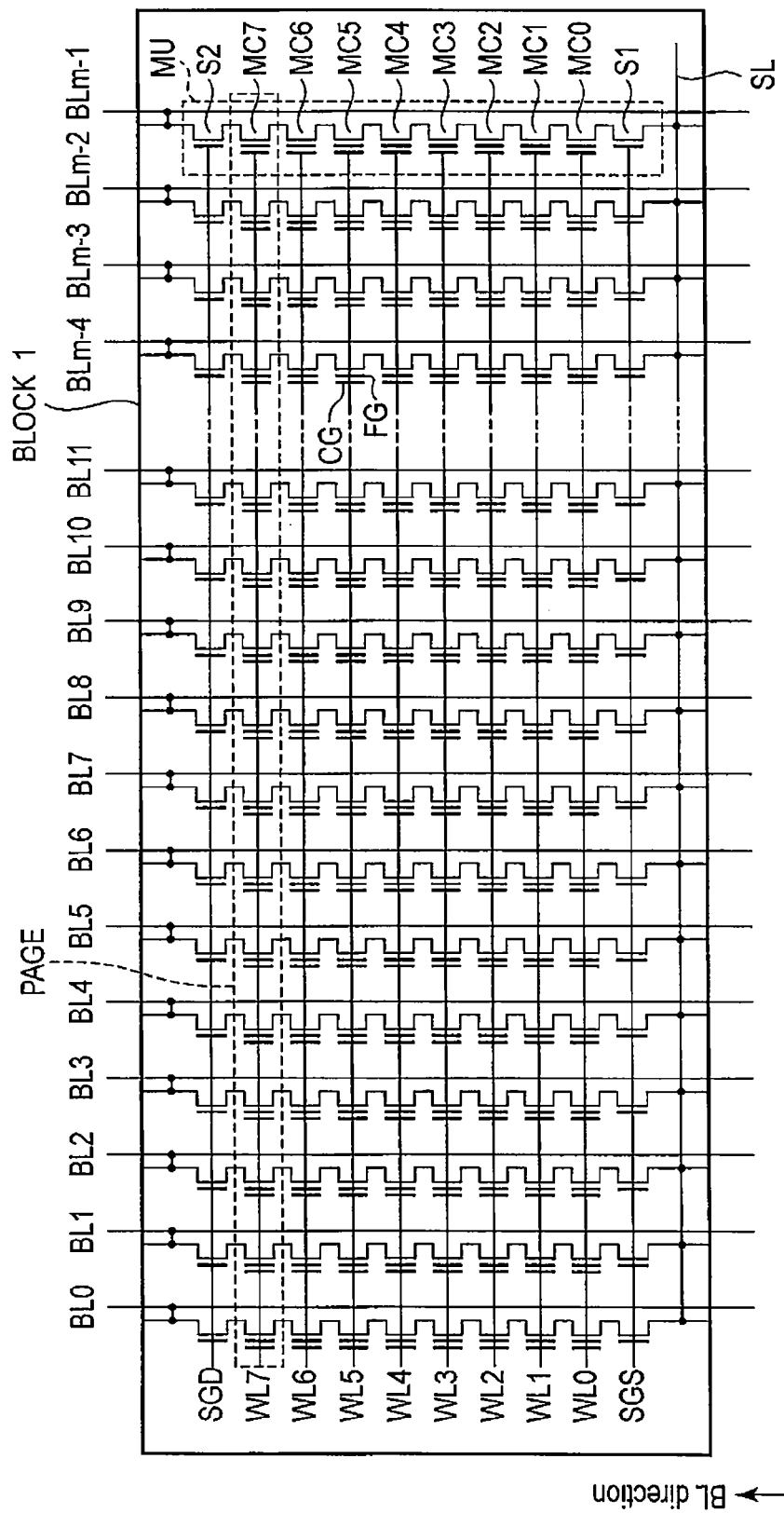
FIG. 13 is an equivalent circuit diagram of a block of the NAND flash memory shown in FIG. 12.

Next, referring to FIG. 13, a structure example of block (BLOCK), which constitutes the memory cell array, is described. Block BLOCK1 in FIG. 12 is described by way of example. In this example, since the memory cells in block BLOCK1 are erased batchwise, this block is a data erase unit.

Block BLOCK1 includes a plurality of memory cell units MU which are arranged in a word line direction (WL direction). Memory cell unit MU includes a NAND string (memory cell string) which includes 8 memory cells MC0 to MC7 having current paths connected in series and arranged in a bit line direction (BL direction) crossing the WL direction; a source-side select transistor S1 connected to one end of the current path of the NAND string; and a drain-side select transistor S2 connected to the other end of the current path of the NAND string.

In the present embodiment, memory cell unit MU includes 8 memory cells MC0 to MC7. However, the number of memory cells is not limited to 8, and may be two or more, for example, 56 or 32.

The other end of the current path of source-side select transistor S1 is connected to a source line SL. The other end of the current path of drain-side select transistor S2 is connected to a bit line BLm-1 which is provided above memory cell unit MU in association with each memory cell unit MU and extends in the BL direction.

Word lines WL0 to WL7 extend in the WL direction, and are connected commonly to the control electrodes of the plural memory cells in the WL direction. A select gate line SGS extends in the WL direction, and is connected commonly to the plural select transistors S1 in the WL direction. Similarly, a select gate line SGD extends in the WL direction, and is connected commonly to the plural select transistors S2 in the WL direction.

A page (PAGE) is present in association with each of word lines WL0 to WL7. For example, as indicated by a broken line in FIG. 13, a page 7 (PAGE 7) is present in association with word line WL7. Since a data read operation and a data write operation are executed in units of page (PAGE), page (PAGE) is a data read unit and a data write unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory card comprising:
   a controller; and
   a memory device controlled by the controller,
   wherein the memory device includes an unreadable area which stores a data element used for an authentication process, the unreadable area being prohibited from being read from outside, and a readable area which stores key index data, encrypted secret data, and family key block data,
   wherein the controller is configured to:
   read the family key block data from the readable area of the memory device, and send the family key block data to a host apparatus in response to receiving a read command for the family key block data from the host apparatus,
   read the encrypted secret data from the readable area of the memory device, and send the encrypted secret data to the host apparatus in response to receiving a read command for the encrypted secret data from the host apparatus,
   read the key index data from the readable area of the memory device, and send the key index data to the host apparatus after receiving a read command for the key index data from the host apparatus, and
   send constant number data received from the host apparatus to the memory device, after receiving a command from the host apparatus for obtaining authentication information,
   wherein the memory device is configured to calculate authentication information using the data element, and
   wherein the controller is configured to read the authentication information from the memory device and send the authentication information to the host apparatus after the memory device calculates the authentication information.

2. A host apparatus capable of communicating with a memory device via a controller, wherein the host apparatus is configured to:
   send a read command for family key block data to cause the controller to read the family key block data from a readable area of the memory device,
   send a read command for encrypted secret data to cause the controller to read the encrypted secret data from a readable area of the memory device,
   receive the encrypted secret data from the controller,
   decrypt the encrypted secret data to obtain secret data;
   send a read command for key index data to cause the controller to read the key index data from a readable area of the memory device,
   receive the key index data from the controller,
   send a command for obtaining first authentication information, send random number data and constant number data via the controller to the memory device, and receive the first authentication information calculated by the memory device,
   calculate second authentication information using the family key block data, secret data, key index data and random number data, and
   verify the first authentication information using the second authentication information.

3. The host apparatus as recited in claim 2, wherein the host apparatus is configured to decrypt the encrypted secret information using the family key block data.

4. A host apparatus:
   wherein the host apparatus is configured to:
   read family key block data from a readable area of an external memory device,
   read encrypted secret data from a readable area of the external memory device,
   read key index data from a readable area of the external memory device,
   send data along with a request for obtaining first authentication information data to the external memory device, and receive from the external memory device, the first authentication information generated by the external memory device, decrypt the encrypted secret data to obtain secret data, calculate second authentication information using the family key block data, secret data and key index data, and verify the first authentication information using the second authentication information.

5. The host apparatus as recited in claim 4, wherein the host apparatus is configured to decrypt the encrypted secret information using the family key block data.

6. The host apparatus as recited in claim 4, wherein the data is random number data.

\* \* \* \* \*